(12) United States Patent
Xia et al.

(10) Patent No.: US 11,703,032 B2
(45) Date of Patent: Jul. 18, 2023

(54) OPTIMAL DISPATCHING METHOD AND SYSTEM FOR WIND POWER GENERATION AND ENERGY STORAGE COMBINED SYSTEM

(71) Applicant: North China Electric Power University, Beijing (CN)

(72) Inventors: Shiwei Xia, Beijing (CN); Panpan Li, Beijing (CN); Liangyun Song, Beijing (CN); Jixian Qu, Beijing (CN); Yuehui Huang, Beijing (CN)

(73) Assignee: North China Electric Power University, Beijing (CN)

( * ) Notice: Subject to any disclaimer, the term of this patent is extended or adjusted under 35 U.S.C. 154(b) by 0 days.

(21) Appl. No.: 17/581,397

(22) Filed: Jan. 21, 2022

(65) Prior Publication Data

US 2023/0009681 A1    Jan. 12, 2023

(30) Foreign Application Priority Data

Jul. 5, 2021   (CN) .......................... 202110756593.4

(51) Int. Cl.
*F03D 9/00*      (2016.01)
*H02P 9/04*      (2006.01)
(Continued)

(52) U.S. Cl.
CPC ........... *F03D 7/048* (2013.01); *F03D 7/0268* (2013.01); *F03D 7/0272* (2013.01); *F03D 7/046* (2013.01);
(Continued)

(58) Field of Classification Search
CPC ...... F03D 7/0268; F03D 7/0272; F03D 7/046; F03D 7/048; F03D 17/00; F05B 2200/22; F05B 2270/1077; F05B 2270/20
See application file for complete search history.

(56) References Cited

U.S. PATENT DOCUMENTS 9,058,443 B2 *  6/2015  Ghosh .................... G06F 30/13
9,058,444 B2 *  6/2015  Ghosh .................... G06F 30/18
(Continued)

FOREIGN PATENT DOCUMENTS

CN      110212579 A  *  9/2019

OTHER PUBLICATIONS

Machine translations of the claims of CN 110212579A (Year: 2019).*

(Continued)

*Primary Examiner* — Tulsidas C Patel
*Assistant Examiner* — Thomas K Quigley
(74) *Attorney, Agent, or Firm* — McDonnell Boehnen Hulbert & Berghoff LLP

(57) ABSTRACT

An optimal dispatching method and system for a wind power generation and energy storage combined system are provided. Uncertainty of a wind turbine output is characterized based on spatio-temporal coupling of the wind turbine output and an interval uncertainty set. Compared with a traditional symmetric interval uncertainty set, the uncertainty set that considers spatio-temporal effects effectively excludes some extreme scenarios with a very small probability of occurrence and reduces conservativeness of a model. A two-stage robust optimal dispatching model for the wind power generation and energy storage combined system is constructed, and a linearization technology and a nested column-and-constraint generation (C&CG) strategy are used to efficiently solve the model.

10 Claims, 2 Drawing Sheets

(51) Int. Cl.
    *F03D 7/04*           (2006.01)
    *F03D 17/00*         (2016.01)
    *F03D 7/02*           (2006.01)

(52) U.S. Cl.
    CPC .......... *F03D 17/00* (2016.05); *F05B 2200/22* (2013.01); *F05B 2270/1077* (2020.08); *F05B 2270/20* (2013.01)

(56) References Cited

U.S. PATENT DOCUMENTS

| | | | |
|---|---|---|---|
| 9,489,701 B2* | 11/2016 | Emadi | G06Q 50/06 |
| 9,953,117 B2* | 4/2018 | Ghosh | G06F 17/10 |
| 2014/0025351 A1* | 1/2014 | Ghosh | G06F 17/10 |
| | | | 703/2 |
| 2014/0025352 A1* | 1/2014 | Ghosh | G06F 30/13 |
| | | | 703/2 |
| 2014/0039710 A1* | 2/2014 | Carter | G05B 13/041 |
| | | | 700/291 |
| 2014/0129040 A1* | 5/2014 | Emadi | G06Q 50/06 |
| | | | 700/291 |
| 2015/0278412 A1* | 10/2015 | Ghosh | G06F 30/18 |
| | | | 703/2 |
| 2020/0301384 A1* | 9/2020 | Chiang | H02J 3/0075 |
| 2020/0310369 A1* | 10/2020 | Raghunathan | G06F 17/11 |

OTHER PUBLICATIONS

Machine translations of the disclosure of CN 110212579A (Year: 2019).*

* cited by examiner

OPTIMAL DISPATCHING METHOD AND SYSTEM FOR WIND POWER GENERATION AND ENERGY STORAGE COMBINED SYSTEM

CROSS REFERENCE TO RELATED APPLICATION(S)

This patent application claims the benefit and priority of Chinese Patent Application No. 202110756593.4 filed on Jul. 5, 2021, the disclosure of which is incorporated by reference herein in its entirety as part of the present application.

FIELD

The present disclosure relates to the technical field of optimal dispatching of a wind power generation and energy storage combined system, and in particular, to an optimal dispatching method and system for a wind power generation and energy storage combined system.

BACKGROUND

The increasingly serious global energy crisis and environmental pollution problems make it an inevitable trend to seek a clean and renewable energy development mode. As a new pollution-free and renewable energy, wind power has drawn great attention in the application of power systems inside and outside China. A wind turbine output has significant randomness and fluctuation, and its large-scale grid connection makes optimal dispatching of a power system face more uncertain factors. A dispatching result obtained by using a previous deterministic dispatching method may deviate from an actual operating situation and cannot meet the requirements of safe and flexible operation of modern power systems. The rapid development of energy storage technologies provides a new idea for power system dispatching and operation. The combination of wind power generation and energy storage involved in the optimal dispatching of power systems facilitates smoothing and suppression of the fluctuation of the wind turbine output, improving the capability of wind power accommodation, and effectively enhancing system controllability. In this context, it is of great theoretical value and practical significance to appropriately characterize the fluctuation of the wind turbine output, and to study optimal dispatching of a wind power generation and energy storage combined system under the background of uncertainty.

The core of the dispatching of the wind power generation and energy storage combined system under the background of high proportion of wind power is to appropriately characterize and handle the uncertainty of the wind turbine output. In a stochastic optimization method, a probability density function of an uncertainty variable is obtained through fitting based on historical data, and a large number of scenario sets are generated through scenario sampling to transform an uncertainty optimization problem into a deterministic problem of a single scenario. In actual engineering, a wind turbine output has significant randomness and fluctuation due to natural factors and regional factors, and it is difficult to obtain an exact probability density function of the wind turbine output. Therefore, the stochastic optimization method performs poorly in practice. In fact, to ensure calculation accuracy, the large number of scenario sets often needs to be generated in the stochastic optimization method, resulting in a very large calculation scale of the method, long calculation duration, and incapability to implement real-time dispatching of modern power systems. Although the number of scenarios can be reduced by setting a scenario constraint and using a scenario reduction technology, the scenario constraint is relatively subjective. Consequently, the accuracy of the model is reduced, and a calculation result has relatively low credibility. In terms of solution, the optimal dispatching model for the wind power generation and energy storage combined system is mathematically a high-dimensional and nonlinear programming problem, which cannot be directly and efficiently solved.

Therefore, those skilled in the art urgently need to provide a new optimal dispatching method for a wind power generation and energy storage combined system to effectively handle the uncertainty of a wind power output and overcome the disadvantages of a large calculation amount and low solution efficiency of the optimal dispatching model.

SUMMARY

The present disclosure provides an optimal dispatching method and system for a wind power generation and energy storage combined system to improve the efficiency of solving an optimal dispatching model considering wind power uncertainty.

To implement the foregoing objective, the present disclosure provides the following solutions:

An optimal dispatching method for a wind power generation and energy storage combined system includes:

constructing, based on spatio-temporal coupling of a wind turbine output, a wind power uncertainty set used to characterize uncertainty of the wind turbine output;

constructing an optimal dispatching model for the wind power generation and energy storage combined system by using the wind power uncertainty set as a wind power output constraint;

linearizing the optimal dispatching model to obtain a linearized optimal dispatching model; and solving the linearized optimal dispatching model in a nested manner by using a column-and-constraint generation (C&CG) algorithm to determine an optimal dispatching plan for the wind power generation and energy storage combined system, and optimally dispatch the wind power generation and energy storage combined system according to the optimal dispatching plan.

In an embodiment, the constructing, based on spatio-temporal coupling of a wind turbine output, a wind power uncertainty set used to characterize uncertainty of the wind turbine output may specifically include:

determining spatial-temporal uncertainty parameters by using formulas $$\begin{cases} W_{w,t}^u - W_{w,t}^l = \phi^{-1}\left(\frac{1+\alpha}{2}\right)\sigma_{w,t} \\ \Gamma_w^S = W\sqrt{\frac{\pi}{2}} + \sqrt{\frac{W(\pi-2)}{\pi}}\phi^{-1}(\alpha) \\ \Gamma_t^T = T\sqrt{\frac{\pi}{2}} + \sqrt{\frac{T(\pi-2)}{\pi}}\phi^{-1}(\alpha) \end{cases}$$

according to the Lindeberg-Levy central limit theorem, where $W_{w,t}^l$ and $W_{w,t}^u$ represent upper and lower output limits of a $w^{th}$ wind farm at a time $t$, respectively; $\Phi^{-1}(\cdot)$ represents an inverse function of a standard normal distribution cumulative probability density function; $\alpha$ represents a parameter used to adjust conservativeness of the set; $\sigma_{w,t}$ represents a variance of the $w^{th}$ wind farm at the time t; $\Gamma_w^S$ represents a spatial constraint parameter of output power of the $w^{th}$ wind farm; $\Gamma_t^T$ represents a time parameter of wind farm output power, W represents a number of wind farms; and T represents a dispatching period; and constructing, based on the spatio-temporal uncertainty parameters and spatio-temporal coupling of the wind turbine output, the wind power uncertainty set used to characterize the uncertainty of the wind turbine output as $$\begin{cases} U = \{W_{w,t} | W_{w,t}^l \leq W_{w,t} \leq W_{w,t}^u; \sum_w \frac{|W_{w,t} - W_{w,t}^e|}{w_{w,t}^h} \leq \Gamma_w^S; \sum_t \frac{|W_{w,t} - W_{w,t}^e|}{w_{w,t}^h} \leq \Gamma_t^T, \forall w, t\} \\ W_{w,t}^e = 0.5(W_{w,t}^l + W_{w,t}^u) \\ W_{w,t}^h = 0.5(W_{w,t}^u + W_{w,t}^l) \end{cases};$$

where U represents the wind power uncertainty set; and $W_{w,t}$, $W_{w,t}^e$, $W_{w,t}^h$ represent the output, an expected output, and a historical output of the $w^{th}$ wind farm at the time t.

In an embodiment, the constructing an optimal dispatching model for the wind power generation and energy storage combined system by using the wind power uncertainty set as a wind power output constraint may specifically include:

constructing a start-stop cost model for a conventional unit in the wind power generation and energy storage combined system by using a unit start-stop status and minimum start-stop duration as constraint conditions;

constructing an operating cost model for the conventional unit in the wind power generation and energy storage combined system based on the start-stop cost model by using a grid operating constraint and an energy storage constraint as constraint conditions; and constructing the optimal dispatching model for the wind power generation and energy storage combined system as $$\begin{cases} \min_{u_{g,t}^{on}, u_{g,t}^{off}, z_{g,t}} \left( F_1 + \max_{P_{g,t}, \Delta W_{w,t}, \Delta D_{d,t}, I_{s,t}^{sc}, I_{s,t}^{sd}, p_{s,t}^{sd}, p_{s,t}^{sc}} F_2 \right) \\ u_{g,t}^{on}, u_{g,t}^{off}, z_{g,t} \in C_1 \\ P_{g,t}, \Delta W_{w,t}, \Delta D_{d,t}, I_{s,t}^{sc}, I_{s,t}^{sd}, p_{s,t}^{sd}, p_{s,t}^{sc} \in C_2 \\ W_{w,t} \in U \end{cases}$$

based on the start-stop cost model and operating cost model by using the wind power uncertainty set as the wind power output constraint;

where $F_1$ represents a start-stop cost of the conventional unit, and $F_Z$ represents a sum of an output cost, a wind energy curtailment cost, a load shedding cost, an energy storage cycle aging cost, and a charge and discharge cost of the conventional unit; $C_1$ and $C_2$ represent constraints of the start-stop cost model and operating cost model, respectively, and U represents the wind power uncertainty set, namely, the wind power output constraint; $u_{g,t}^{on}$ and $u_{g,t}^{off}$ are 0-1 variables that represent startup and shutdown of a unit g at a time t, where when $u_{g,t}^{on}=1$, the unit g changes from a shutdown state to a startup state at the time t, otherwise, the value is 0, and when $u_{g,t}^{off}=1$, the unit g changes from the startup state to the shutdown state; $z_{g,t}$ represents an operating status of the unit g at the time t, and if $z_{g,t}$ is 1, the unit g is in an operating state, otherwise, the unit g is in the shutdown state; $P_{g,t}$ represents a wind turbine output of the unit g at the time t; $\Delta W_{w,t}$, $\Delta D_{d,t}$ represent an amount of curtailed wind energy of the $w^{th}$ wind farm at the time t and a load shedding amount of a load d at the time t, respectively; $I_{s,t}^{sd}$, $I_{s,t}^{sc}$ represent binary variables, where $I_{s,t}^{sd}=1$ indicates that an energy storage power station s is in a discharge state at the time t, and $I_{s,t}^{sc}=1$ indicates it is in a charge state; and $p_{s,t}^{sd}$ and $p_{s,t}^{sc}$ represent a discharge capacity and charge capacity of the energy storage power station S at the time t, respectively.

In an embodiment, the solving the linearized optimal dispatching model in a nested manner by using a C&CG algorithm to determine an optimal dispatching plan for the wind power generation and energy storage combined system may specifically include:

dividing the optimal dispatching model into a first main problem optimization model $$\begin{cases} \min c^T x + \omega \\ Ax \leq b \\ \omega \geq d^T y^{(l)} + g^T z^{(l)} \ \forall \ l \in m \\ Ey^{(l)} + Fz^{(l)} \leq f - Hx - Gu_*^{(l)} \ \forall \ l \in m \end{cases}$$

and a first subproblems optimization model $$\begin{cases} \max\min d^T y + g^T z \\ Ey + Fz \leq f - Hx^* - Gu, z \in \{0, 1\} \end{cases},$$

where x represents a decision variable of the start-stop cost model; y represents a continuous decision variable set of the operating cost model; z represents a binary decision variable of the operating cost model; $u_*$ represents an uncertainty variable in a worst scenario; b, c, d, g, f, A, E, F, H, G represent a corresponding constant coefficient matrix; $c^T x$ represents an objective function of the start-stop cost model; $Ax \leq b$ represents a constraint condition of the start-stop cost model; $d^T y + g^T z$ represents an objective function of the operating cost model, namely, the sum of the output cost, wind energy curtailment cost, load shedding cost, energy storage cycle aging cost, and charge and discharge cost of the unit; $Ey + Fz \leq f - Hx - Gu$ represents a constraint condition of the operating cost model; $\omega$ represents a variable that reflects a constraint of a first subproblem on a first main problem; l represents a variable that indicates a number of iterations of the main problem; $y^{(l)}$ represents a continuous decision variable in the first subproblem during an $l^{th}$ iteration; $z^{(l)}$ represents a binary decision variable in the first subproblem during the $l^{th}$ iteration; and $u_*^{(l)}$ represents an uncertainty variable in the worst scenario in the first subproblem during the $l^{th}$ iteration;

initializing an outer lower bound $LB^{out}$ to negative infinity, an outer upper bound $UB^{out}$ to positive infinity, and a number m of outer iterations to 1;

performing outer loop solution on the first main problem optimization model to obtain an optimal solution set x* of decision variables of the start-stop cost model and ω* used for a next inner loop iteration, where ω* is optimal ω obtained by solving the first main problem optimization model;

performing inner loop solution on the first subproblem optimization model to obtain a worst scenario $u_*^+$ during an $m^{th}$ outer loop;

updating the outer upper bound $UB^{out}=\min\{UB^{out}, c^T x^* + \omega^*\}$ based on the optimal solution set $x^*$ of the decision variables of the start-stop cost model and $\omega^*$;

determining whether an absolute value of a difference between the updated outer upper bound and the outer lower bound is greater than a difference threshold to obtain a first determination result; and if the first determination result is yes, adding $$\begin{cases} \omega \geq d^T y^{(m+1)} + g^T z^{(m+1)} \\ Ey^{(m+1)} + Fz^{(m+1)} \leq f - Hx - Gu_*^+ \end{cases}$$

as a constraint into the first main problem optimization model, increasing the number of outer iterations by 1, and returning to the step of performing outer loop solution on the first main problem optimization model to obtain a first-stage optimal solution set $x^*$ and $w^*$ used for a next inner loop iteration, where $y^{(m+1)}$ represents a variable y used for an $(m+1)^{th}$ iteration; and $z^{(m+1)}$ represents a variable z used for the $(m+1)^{th}$ iteration; or if the first determination result is no, outputting the optimal dispatching plan for the wind power generation and energy storage combined system considering the worst scenario $u_*^+$.

In an embodiment, the performing inner loop solution on the first subproblem optimization model to obtain a worst scenario $u_*^+$ during an $m^{th}$ outer loop may specifically include:

dividing the first subproblem optimization model into a second main problem optimization model $$\begin{cases} \min d^T y + g^T z \\ Ey + Fz \leq f - H_x^* - Gu^* \end{cases}$$

and a second subproblem optimization model $$\begin{cases} \max \theta \\ \theta \leq g^T z^{(k)} + (f - Hx^* - Gu - Fz^{(k)})^T \pi^{(k)} \\ E^T \pi^{(k)} \leq d^T, \pi^{(k)} \geq 0, u \in U \ \forall k \leq n, \end{cases}$$

where $\theta$ represents an objective function of a second subproblem; $z^{(k)}$ represents a binary decision variable in a second main problem during a $k^{th}$ iteration; and $\pi^{(k)}$ represents a dual variable during the $k^{th}$ iteration;

initializing an inner upper bound $UB^{in}$ to positive infinity, an inner lower bound $LB^{in}$ to negative infinity, and a number n of inner iterations to 1;

solving the second subproblem optimization model to obtain a worst scenario $u^*$ and an optimal value $UB^{in}=\theta^*$ of the inner upper bound;

solving the second main problem optimization model based on the worst scenario $u^*$ to obtain an optimal solution set $y^*$ of the continuous decision variable set of the operating cost model and an optimal solution set $Z^*$ of the binary decision variable of the operating cost model;

updating the inner lower bound $LB^{in}=\max\{LB^{in}, d^T y^* + g^T z^*\}$ based on the optimal solution set $y^*$ of the continuous decision variable set of the operating cost model and the optimal solution set $z^*$ of the binary decision variable of the operating cost model;

determining whether an absolute value of a difference between the inner upper bound and the updated inner lower bound is greater than a difference threshold to obtain a second determination result; and if the second determination result is yes, adding $$\begin{cases} \theta \leq g^T z^{(n+1)} + (f - Hx^* - Gu - Fz^{(n+1)})^T \pi^{(n+1)} \\ E^T \pi^{(n+1)} \leq d^T \end{cases}$$

as a constraint into the second subproblem optimization model, increasing the number of inner iterations by 1, and returning to the step of solving the second subproblem optimization model to obtain the worst scenario $u^*$ and the optimal value $UB^{in}=\theta^*$ of the inner upper bound, where $z^{(n+1)}$ represents a variable z for an $(n+1)^{th}$ iteration; and $\pi^{(n+1)}$ represents a dual variable for the $(n+1)^{th}$ iteration; or if the second determination result is no, outputting the worst scenario $u^*$.

An optimal dispatching system for a wind power generation and energy storage combined system includes:

a wind power uncertainty set construction module, configured to construct, based on spatio-temporal coupling of a wind turbine output, a wind power uncertainty set used to characterize uncertainty of the wind turbine output;

an optimal dispatching model construction module, configured to construct an optimal dispatching model for the wind power generation and energy storage combined system by using the wind power uncertainty set as a wind power output constraint;

a linearized optimal dispatching model obtaining module, configured to linearize the optimal dispatching model to obtain a linearized optimal dispatching model; and an optimal dispatching plan determining module, configured to solve the linearized optimal dispatching model in a nested manner by using a C&CG algorithm to determine an optimal dispatching plan for the wind power generation and energy storage combined system, and optimally dispatch the wind power generation and energy storage combined system according to the optimal dispatching plan.

In an embodiment, the wind power uncertainty set construction module may specifically include:

a spatio-temporal uncertainty parameter determining submodule, configured to determine spatio-temporal uncertainty parameters by using formulas $$\begin{cases} W_{w,t}^u - W_{w,t}^l = \Phi^{-1}\left(\frac{1+\alpha}{2}\right)\sigma_{w,t} \\ \Gamma_w^S = W\sqrt{\frac{\pi}{2}} + \sqrt{\frac{W(\pi-2)}{\pi}}\Phi^{-1}(\alpha) \\ \Gamma_t^T = T\sqrt{\frac{\pi}{2}} + \sqrt{\frac{T(\pi-2)}{\pi}}\Phi^{-1}(\alpha) \end{cases}$$

according to the Lindeberg-Levy central limit theorem, where $W_{w,t}^l$ and $W_{w,t}^u$ represent upper and lower output limits of a $w^{th}$ wind farm at a time t, respectively; $\Phi^{-1}(\cdot)$ represents an inverse function of a standard normal distribution cumulative probability density function; $\alpha$ represents a parameter used to adjust conservativeness of the set; $\sigma_{w,t}$ represents a variance of the $w^{th}$ wind farm at the time t; $\Gamma_w^S$ represents a spatial constraint parameter of output power of the $w^{th}$ wind farm; $\Gamma_t^T$ represents a time parameter of wind farm output power; W represents a number of wind farms; and T represents a dispatching period; and a wind power uncertainty set construction submodule, configured to construct, based on the spatio-temporal uncertainty parameters and spatio-temporal coupling of the wind turbine output, the wind power uncertainty set used to characterize the uncertainty of the wind turbine output as $$\begin{cases} U = \{W_{w,t} | W_{w,t}^l \leq W_{w,t} \leq W_{w,t}^u; \sum_w \frac{|W_{w,t} - W_{w,t}^e|}{W_{w,t}^h} \leq \Gamma_w^S; \sum_t \frac{|W_{w,t} - W_{w,t}^e|}{W_{w,t}^h} \leq \Gamma_t^T, \forall w, t \} \\ W_{w,t}^e = 0.5(W_{w,t}^l + W_{,t}^u) \\ W_{w,t}^h = 0.5(W_{w,t}^u + W_{,t}^l) \end{cases}$$

where U represents the wind power uncertainty set; and $W_{w,t}$, $W_{w,t}^e$, $W_{w,t}^h$ represent the output, an expected output, and a historical output of the $w^{th}$ wind farm at the time t.

In an embodiment, the optimal dispatching model construction module may specifically include:

a start-stop cost model construction submodule, configured to construct a start-stop cost model for a conventional unit in the wind power generation and energy storage combined system by using a unit start-stop status and minimum start-stop duration as constraint conditions;

an operating cost model construction submodule, configured to construct an operating cost model for the conventional unit in the wind power generation and energy storage combined system based on the start-stop cost model by using a grid operating constraint and an energy storage constraint as constraint conditions; and an optimal dispatching model construction submodule, configured to construct the optimal dispatching model for the wind power generation and energy storage combined system as $$\begin{cases} \min_{u_{g,t}^{on}, u_{g,t}^{off}, z_{g,t}} \left( F_1 + \max_{P_{g,t}, \Delta W_{w,t}, \Delta D_{d,t}, I_{s,t}^{sc}, I_{s,t}^{sd}, p_{s,t}^{sd}, p_{s,t}^{sc}} F_2 \right) \\ u_{g,t}^{on}, u_{g,t}^{off}, z_{g,t} \in C_1 \\ P_{g,t}, \Delta W_{w,t}, \Delta D_{d,t}, I_{s,t}^{sc}, I_{s,t}^{sd}, p_{s,t}^{sd}, p_{s,t}^{sc} \in C_2 \\ W_{w,t} \in U \end{cases}$$

based on the start-stop cost model and operating cost model by using the wind power uncertainty set as the wind power output constraint;

where $F_1$ represents a start-stop cost of the conventional unit, and $F_2$ represents a sum of an output cost, a wind energy curtailment cost, a load shedding cost, an energy storage cycle aging cost, and a charge and discharge cost of the conventional unit; $C_1$ and $C_2$ represent constraints of the start-stop cost model and operating cost model, respectively, and U represents the wind power uncertainty set, namely, the wind power output constraint; $u_{g,t}^{on}$ and $u_{g,t}^{off}$ are 0-1 variables that represent startup and shutdown of a unit g at a time t, where when $u_{g,t}^{on}=1$, the unit g changes from a shutdown state to a startup state at the time t, otherwise, the value is 0, and when $u_{g,t}^{off}=1$, the unit g changes from the startup state to the shutdown state; $z_{g,t}$ represents an operating status of the unit g at the time t, and if $z_{g,t}$ is 1, the unit g is in an operating state, otherwise, the unit g is in the shutdown state; $P_{g,t}$ represents a wind turbine output of the unit g at the time t; $\Delta W_{w,t}$, $\Delta D_{d,t}$ represent an amount of curtailed wind energy of the $w^{th}$ wind farm at the time t and a load shedding amount of a load d at the time t, respectively; $I_{s,t}^{sd}$, $I_{s,t}^{sc}$ represent binary variables, where $I_{s,t}^{sd}=1$ indicates that an energy storage power station s is in a discharge state at the time t, and $I_{s,t}^{sc}=1$ indicates it is in a charge state; and $p_{s,t}^{sd}$ and $p_{s,t}^{sc}$ represent a discharge capacity and charge capacity of the energy storage power station s at the time t, respectively.

In an embodiment, the optimal dispatching plan determining module may specifically include:

a first main problem optimization model and first subproblem optimization model division submodule, configured to divide the optimal dispatching model into a first main problem optimization model $$\begin{cases} \min c^T x + \omega \\ Ax \leq b \\ \omega \geq d^T y^{(l)} + g^T z^{(l)} \; \forall \, l \in m \\ E y^{(l)} + F z^{(l)} \leq f - H_x - G u_*^{(l)} \; \forall \, l \in m \end{cases}$$

and a first subproblem optimization $$\begin{cases} \max\min d^T y + g^T z \\ Ey + Fz \leq f - H_x^* - Gu, z \in \{0, 1\}, \end{cases}$$

where X represents a decision variable of the start-stop cost model; Y represents a continuous decision variable set of the operating cost model; z represents a binary decision variable of the operating cost model; $u_*$ represents an uncertainty variable in a worst scenario; b, c, d, g, f, A, E, F, H, G represent a corresponding constant coefficient matrix; cx represents an objective function of the start-stop cost model; $Ax \leq b$ represents a constraint condition of the start-stop cost model; $d^T y + g^T z$ represents an objective function of the operating cost model, namely, the sum of the output cost, wind energy curtailment cost, load shedding cost, energy storage cycle aging cost, and charge and discharge cost of the unit; Ey+Fz≤f−Hx−Gu represents a constraint condition of the operating cost model; ω represents a variable that reflects a constraint of a first subproblem on a first main problem; l represents a variable that indicates a number of iterations of the main problem; $y^{(l)}$ represents a continuous decision variable in the first subproblem during an $l^{th}$ iteration; $z^{(l)}$ represents a binary decision variable in the first subproblem during the $l^{th}$ iteration; and $u_*^{(l)}$ represents an uncertainty variable in the worst scenario in the first subproblem during the $l^{th}$ iteration;

an outer layer initialization submodule, configured to initialize an outer lower bound $LB^{out}$ to negative infinity, an outer upper bound $UB^{out}$ to positive infinity, and a number m of outer iterations to 1;

a decision variable optimal solution set obtaining submodule, configured to perform outer loop solution on the first main problem optimization model to obtain an optimal solution set x* of decision variables of the start-stop cost model and ω* used for a next inner loop iteration, where ω* is optimal ω obtained by solving the first main problem optimization model;

a worst scenario obtaining submodule, configured to perform inner loop solution on the first subproblem optimization model to obtain a worst scenario $u_*^+$ during an $m^{th}$ outer loop;

an outer upper bound update submodule, configured to update the outer upper bound $UB^{out}=\min\{UB^{out}, c^T x^*+\omega^*\}$ based on the optimal solution set $x^*$ of the decision variables of the start-stop cost model and $\omega^*$;

a first determination result obtaining submodule, configured to determine whether an absolute value of a difference between the updated outer upper bound and the outer lower bound is greater than a difference threshold to obtain a first determination result;

a constraint adding submodule, configured to: if the first determination result is yes, add $$\begin{cases} \omega \geq d^T y^{(m+1)} + g^T z^{(m+1)} \\ E y^{(m+1)} + F z^{(m+1)} \leq f - Hx - Gu_*^+ \end{cases}$$

as a constraint into the first main problem optimization model, increase the number of outer iterations by 1, and return to the step of performing outer loop solution on the first main problem optimization model to obtain a first-stage optimal solution set $x^*$ and $\omega^*$ used for a next inner loop iteration, where $y^{(m+1)}$ represents a variable y used for an $(m+1)^{th}$ iteration; and $z^{(m+1)}$ represents a variable z used for the $(m+1)^{th}$ iteration; and an optimal dispatching plan output submodule, configured to: if the first determination result is no, output the optimal dispatching plan for the wind power generation and energy storage combined system considering the worst scenario $u_*^+$.

In an embodiment, the worst scenario obtaining submodule may specifically include:

a second main problem optimization model and second subproblem optimization model division unit, configured to de the first problem optimization model into a second main problem optimization model $$\begin{cases} \min d^T y + g^T z \\ Ey + Fz \leq f - H_x^* - Gu^* \end{cases}$$

and a second subproblem optimization model $$\begin{cases} \max \theta \\ \theta \leq g^T z^{(k)} + \left(f - Hx^* - Gu - Fz^{(k)}\right)^T \pi^{(k)} \\ E^T \pi^{(k)} \leq d^T, \pi^{(k)} \geq 0, u \in U \forall k \leq n, \end{cases}$$

where $\theta$ represents an objective function of a second subproblem; $z^{(k)}$ represents a binary decision variable in a second main problem during a $k^{th}$ iteration; and $\pi^{(k)}$ represents a dual variable during the $k^{th}$ iteration;

an inner layer initialization unit, configured to initialize an inner upper bound $UB^{in}$ to positive infinity, an inner lower bound $LB^{in}$ to negative infinity, and a number n of inner iterations to 1;

an inner upper bound optimal value obtaining unit, configured to solve the second subproblem optimization model to obtain a worst scenario $u^*$ and an optimal value $UB^{in}=\theta^*$ of the inner upper bound;

a second main problem optimization model solution unit, configured to solve the second main problem optimization model based on the worst scenario $u^*$ to obtain an optimal solution set $y^*$ of the continuous decision variable set of the operating cost model and an optimal solution set $z^*$ of the binary decision variable of the operating cost model;

an inner lower bound update unit, configured to update the inner lower bound $LB^{in}=\max\{LB^{in}, d^T y^* + g^T z^*\}$ based on the optimal solution set $y^*$ of the continuous decision variable set of the operating cost model and the optimal solution set $z^*$ of the binary decision variable of the operating cost model;

a second determination result obtaining unit, configured to determine whether an absolute value of a difference between the inner upper bound and the updated inner lower bound is greater than a difference threshold to obtain a second determination result;

a constraint adding unit, configured the second determination result is yes, add $$\begin{cases} \theta \leq g^T z^{(n+1)} + \left(f - H_x^* - Gu - Fz^{(n+1)}\right)^T \pi^{(n+1)} \\ E^T \pi^{(n+1)} \leq d^T \end{cases}$$

as a constraint into the second subproblem optimization model, increase the number of inner iterations by 1, and return to the step of solving the second subproblem optimization model to obtain the worst scenario $u^*$ and the optimal value $UB^{in}=\theta^*$ of the inner upper bound, where $z^{(n+1)}$ represents a variable z for an $(n+1)^{th}$ iteration; and $\pi^{(n+1)}$ represents a dual variable for the $(n+1)^{th}$ iteration; and a worst scenario output unit, configured to: if the second determination result is no, output the worst scenario $u^*$.

Based on specific embodiments provided in the present disclosure, the present disclosure has the following technical effects:

The present disclosure provides the optimal dispatching method and system for a wind power generation and energy storage combined system. The uncertainty of the wind turbine output is characterized based on the spatio-temporal coupling of the wind turbine output and an interval uncertainty set. Compared with a traditional symmetric interval uncertainty set, the uncertainty set that considers spatio-temporal effects effectively excludes some extreme scenarios with a very small probability of occurrence and reduces the conservativeness of the model. The two-stage robust optimal dispatching model for the wind power generation and energy storage combined system is constructed, and the linearization technology and nested C&CG strategy are used to efficiently solve the model.

BRIEF DESCRIPTION OF THE DRAWINGS

The accompanying drawings required in the embodiments will be described below briefly for the purpose of explaining the technical solutions in embodiments of the present disclosure or in the prior art more clearly. Apparently, the accompanying drawings in the following description show merely some embodiments of the present disclosure, and other drawings can be derived from these accompanying drawings by those of ordinary skill in the art without creative efforts.

DETAILED DESCRIPTION

The technical solutions of the embodiments of the present disclosure are clearly and completely described below with reference to the accompanying drawings. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

The present disclosure provides an optimal dispatching method and system for a wind power generation and energy storage combined system to improve the efficiency of solving an optimal dispatching model considering wind power uncertainty.

To make the foregoing objective, features, and advantages of the present disclosure clearer and more comprehensible, the present disclosure will be further described in detail below with reference to the accompanying drawings and specific embodiments.

In the present disclosure, a spatio-temporal uncertainty set is utilized to describe boundary information of a wind power output, and a robust optimal dispatching model for a wind power generation and energy storage combined system is constructed to obtain an optimal operating cost in a worst scenario. In addition, considering that it is difficult to directly solve the model because the model is a nonlinear programming problem with a min-max-min three-layer structure and involves discrete binary variables, the present disclosure proposes an efficient solution method based on a linearization technology and a nested C&CG algorithm.

Figure 1:
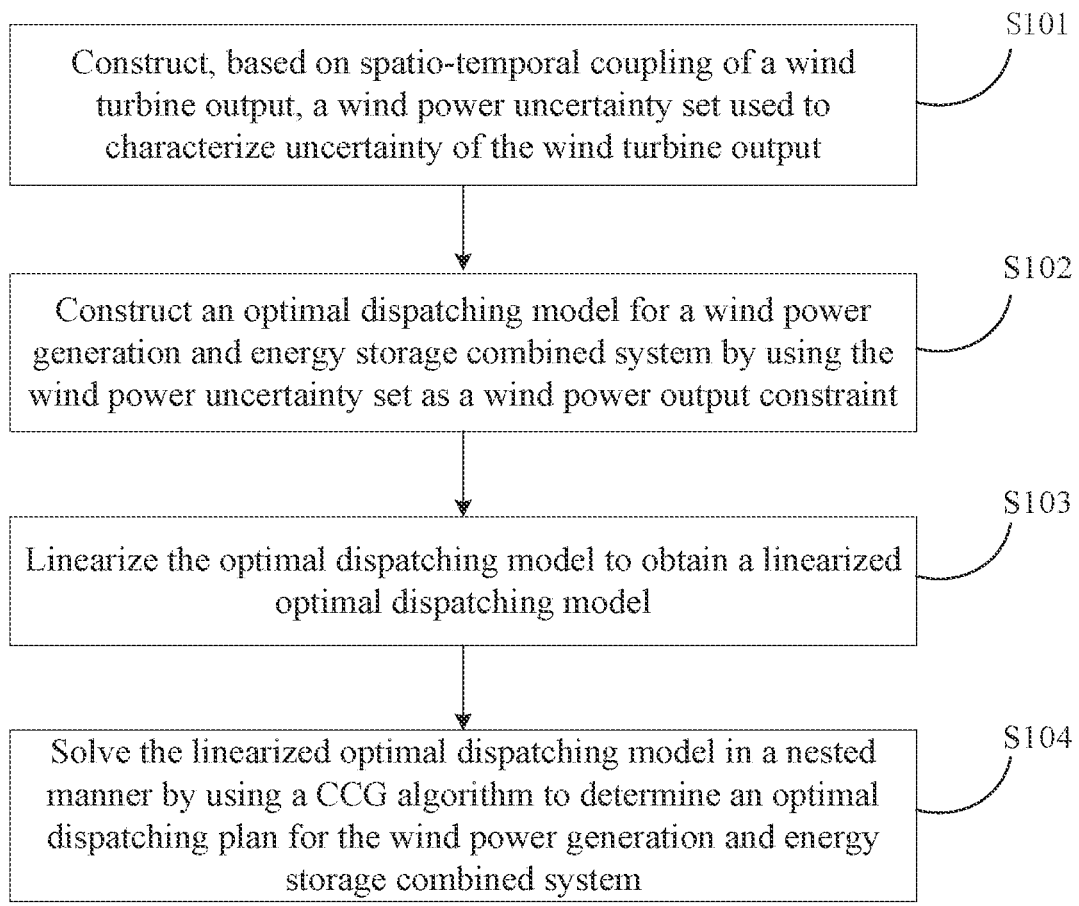
FIG. 1 is a flowchart of an optimal dispatching method for a wind power generation and energy storage combined system according to the present disclosure.

As shown in FIG. 1, an optimal dispatching method for a wind power generation and energy storage combined system provided in the present disclosure includes the following steps:

Step 101: Constructing, based on spatio-temporal coupling of a wind turbine output, a wind power uncertainty set used to characterize uncertainty of the wind turbine output.

Step 102: Constructing an optimal dispatching model for the wind power generation and energy storage combined system by using the wind power uncertainty set as a wind power output constraint.

Step 103: Linearizing the optimal dispatching model to obtain a linearized optimal dispatching model.

Step 104: Solving the linearized optimal dispatching model in a nested manner by using a C&CG algorithm to determine an optimal dispatching plan for the wind power generation and energy storage combined system, and optimally dispatching the wind power generation and energy storage combined system according to the optimal dispatching plan.

A specific process may be as follows:

In step 101, the uncertainty of the wind turbine output is characterized based on an interval uncertainty set. In this method, the corresponding uncertainty set is constructed based on the spatio-temporal coupling of the wind turbine output. This effectively reduces the conservativeness of the model. Characterizing the uncertainty of the wind turbine output based on the interval uncertainty set may be specifically implemented as follows.

The fundamental goal of the robust optimization problem may be stated as follows. When an uncertainty parameter is within any possible value range, all constraint conditions of the model can be met, and an optimal value in a worst scenario is obtained for an objective function. The construction of the uncertainty set is closely related to the accuracy and solution efficiency of the model. To effectively avoid excessively conservative decision results, the uncertainty set is constructed based on spatio-temporal correlation of wind power.

Spatio-temporal uncertainty parameters are determined by using formulas $$\begin{cases} W_{w,t}^u - W_{w,t}^l = \Phi^{-1}\left(\frac{1+\alpha}{2}\right)\sigma_{w,t} \\ \Gamma_w^S = W\sqrt{\frac{\pi}{2}} + \sqrt{\frac{W(\pi-2)}{\pi}}\Phi^{-1}(\alpha) \\ \Gamma_t^T = T\sqrt{\frac{\pi}{2}} + \sqrt{\frac{T(\pi-2)}{\pi}}\Phi^{-1}(\alpha) \end{cases}$$

according to the Lindeberg-Levy central limit theorem, where $W_{w,t}^l$ and $W_{w,t}^u$ represent upper and lower output limits of a $w^{th}$ wind farm at a time t, respectively; $\Phi^{-1}(\cdot)$ represents an inverse function of a standard normal distribution cumulative probability density function; a represents a parameter used to adjust conservativeness of the set; $\sigma_{w,t}$ represents a variance of the $w^{th}$ wind farm at the time t; $\Gamma_w^S$ represents a spatial constraint parameter of output power of the $w^{th}$ wind farm; $\Gamma_t^T$ represents a time parameter of wind farm output power; W represents a number of wind farms; and T represents a dispatching period.

The wind power uncertainty set used to characterize the uncertainty of the wind turbine output is constructed based on the spatio-temporal uncertainty parameters and spatio-temporal coupling of the wind turbine output $$\begin{cases} U = \{W_{w,t} | W_{w,t}^l \le W_{w,t} \le W_{w,t}^u; \sum_w \frac{|W_{w,t} - W_{w,t}^e|}{W_{w,t}^h} \le \Gamma_w^S; \sum_t \frac{|W_{w,t} - W_{w,t}^e|}{W_{w,t}^h} \le \Gamma_t^T, \forall w, t\} \\ W_{w,t}^e = 0.5(W_{w,t}^l + W_{w,t}^u) \\ W_{w,t}^h = 0.5(W_{w,t}^u + W_{w,t}^l) \end{cases}$$

The first item in the formulas represents the uncertainty set of the wind power output. The uncertainty set is characterized by using historical wind power output values, and takes into account the spatio-temporal coupling of the wind power. The second and third items represent relationships between the upper and lower limits of the wind power output and an expected wind power output, and a historical wind power output.

U represents the wind power uncertainty set; and $W_{w,t}$, $W_{w,t}^e$, $W_{w,t}^h$ represent the output, an expected output, and a historical output of the $w^{th}$ wind farm at the time t.

Step 101 is performed to obtain the wind power uncertainty model. This model is based on historical wind power output data and has strong adaptability. In addition, the conservativeness of the model is reduced through parameter settings. This model will be used in step 102.

In step 102, the optimal dispatching model for the wind power generation and energy storage combined system is constructed by using the wind power uncertainty set as the wind power output constraint. In a first stage of the model, determine a start-stop status of a conventional unit by using a unit start-stop status and minimum start-stop duration as constraint conditions. In a second stage, obtain a minimized total operating cost based on the unit start-stop status determined in the first stage by using a unit operating constraint, a power balance constraint, and an energy storage system charge and discharge power constraint as constraint conditions.

The first stage of the two-stage robust optimization model for the wind power generation and energy storage combined system is to determine a day-ahead start-stop plan of the generating unit, and an objective function is to minimize a start-stop cost of the conventional unit. Corresponding decision variables are the start-stop status and operating status of the unit. The constraint conditions include a start-stop constraint and minimum start-stop duration constraint. A first-stage model (start-stop cost model of the conventional unit) can be expressed as follows:

for the wind power generation and energy storage combined system is to obtain an economic operating cost of the system in a worst scenario. Decision variables are a unit output, an amount of curtailed wind energy, a load shedding amount, an energy storage status, and corresponding charge and discharge power. Corresponding constraint conditions include grid operating constraints and energy storage constraints. A second-stage model (operating cost model of the conventional unit) can be expressed as follows:

$$\begin{cases} F_1 = \min \sum_{t=1}^{T} \sum_{g=1}^{G'} \left( S_{T,g} u_{g,t}^{on} + S_{D,g} u_{g,t}^{off} \right) \\ z_{g,t} - z_{g,t-1} \le u_{g,t}^{on} \ \forall g \in G', \forall t \in T \\ z_{g,t-1} - z_{g,t} \le u_{g,t}^{off} \ \forall g \in G', \forall t \in T \\ C_1 : (z_{g,(t+1)} - z_{g,t}) T_g^{on} - \sum_{k=t+2}^{\min\{t+T_g^{on}, T\}} z_{g,k} \le \max\{1, T_g^{on} - T + t - 1\} \forall g \in G', \forall t \in 1, 2, \ldots T-2 \\ (z_{g,(t+1)} - z_{g,t}) T_g^{off} - \sum_{k=t+2}^{\min\{t+T_g^{off}, T\}} z_{g,k} \le T_g^{off} \forall g \in G', \forall t \in 1, 2, \ldots T-2 \end{cases}$$

Where G' represents a number of conventional units; T represents the dispatching period, and $S_{T,g}$, $S_{D,g}$ represent startup and shutdown costs of a unit g during a time period t, respectively; and $T_g^{on}$ and $T_g^{off}$ represent minimum continuous startup and shutdown duration of the unit, respec- $$\begin{cases} F_2 = \\ \max \min \sum_{t=1}^{T} \sum_{g=1}^{G'} \left( a_g P_{g,t}^2 + b_g P_{g,t} + c_g \right) + \sum_{t=1}^{T} \sum_{w=1}^{W} \delta_w \Delta W_{w,t} + \sum_{t=1}^{T} \sum_{d=1}^{D} \delta_d \Delta D_{d,t} + \\ \sum_{t=2}^{T} \sum_{s=1}^{S} \delta_{c,s} \left( I_{s,t}^{sd} \left( 1 - I_{s,t-1}^{sd} \right) + I_{s,t}^{sc} \left( 1 - I_{s,t-1}^{sc} \right) \right) + \sum_{t=1}^{T} \sum_{s=1}^{S} \delta_s (p_{sd,t} + p_{sc,t}) \\ C_2 : (6) \sim (7) \end{cases}$$

tively. The second formula represents a unit startup constraint. Only when the unit is in the operating status $z_{g,t}=1$ and $z_{g,t-1}=0$, that is, the unit is in an operating state at the time t and in a shutdown state at a time t−1, $u_{g,t}^{on}=1$, which indicates that the unit is started at the time t. The third formula represents a unit shutdown constraint. Only when the unit is in the operating status $z_{g,t-1}=1$ and $z_{g,t}=0$ that is, the unit is in the operating state at the time t−1 and in the shutdown off state at the time t, $u_{g,t}^{off}=1$, which indicates that the unit is shut down at the time t. The fourth formula represents that if the unit is started, its continuous operating duration is at least $T_g^{on}$. The last formula represents that if the unit is shut down, its continuous shutdown duration is at least $T_g^{off}$. The conventional unit is generally a thermal power unit.

In the first stage, the start-stop status of the unit is determined, and the start-stop status affects the output of the unit. The output of the unit is a decision variable in the second stage. There is parameter transmission in these two stages. The second stage of the robust optimization model Where W, D, and S represent the number of wind farms, a number of load nodes, and a number of energy storage devices, respectively; $a_g$, $b_g$, $c_g$ represent unit fuel cost coefficients; $\delta_w$, $\delta_d$, $\delta_{c,s}$, $\delta_s$ represent a unit wind energy curtailment penalty coefficient, a unit load shedding penalty coefficient, a unit charge and discharge cycle aging cost, and a unit charge and discharge cost, respectively; and the second-stage constraint conditions include formulas (6) and (7).

The grid operating constraints include a unit output power constraint, a unit ramp constraint, a system power balance constraint, a transmission line safety constraint, a wind energy curtailment constraint, and a load shedding constraint. The energy storage constraints include an energy storage charge and discharge status constraint, charge and discharge power constraints, and an energy storage charge constraint. The grid operating constraints can be expressed as follows:

$$\begin{cases} z_{g,t} P_g^{min} \leq P_{g,t} \leq z_{g,t} P_g^{max} \; \forall \, g, \forall \, t \\ P_{g,t} - P_{g,t-1} \leq R_{U1} \\ P_{g,t-1} - P_{g,t} \leq R_{D1} \\ \sum_{g=1}^{G'} P_{g,t} + \sum_{s=1}^{S} \left( p_{s,t}^{sd} - p_{s,t}^{sc} \right) + \sum_{w=1}^{W} (W_{w,t} - \Delta W_{w,t}) = \sum_{d=1}^{D} (D_{d,t} - \Delta D_{d,t}) \\ -F_f \leq \\ \sum_{k \in B} K_{fb} \Big( \sum_{g \in G_b} P_{g,t} + \sum_{s \in S_b} \left( p_{s,t}^{sd} - p_{s,t}^{sc} \right) + \sum_{w \in w_b} (w_{w,t} - \Delta W_{w,t}) - \sum_{d \in D} (D_{d,t} - \Delta D_{d,t}) \Big) \leq F_f \\ 0 \leq \Delta W_{w,t} \leq W_{w,t} \\ 0 \leq \Delta D_{d,t} \leq D_{d,t} \end{cases}$$

The formula for the grid operating constraints is the formula (6). In the formula, $p_g^{min}$ and $p_g^{max}$ represent minimum and maximum output power of a unit g, respectively; $R_{Ui}$ and $R_{Di}$ represent upward and downward ramp rates of the conventional unit, respectively; $W_{w,t}$ represents predicted output power of the $w^{th}$ wind farm at the time t, and $D_{d,t}$ represents predicted active power of a load d at the time t; $F_f$ represents a maximum transmission capacity of a line, and $K_{fb}$ represents a sensitivity coefficient of a line b; and $p_{s,t}^{sd}$ and $p_{s,t}^{sc}$ represent a discharge capacity and charge capacity of an energy storage power station s at the time t, respectively. The first item in the formula (6) represents an upper and lower limit constraint of unit output power, which is related to the unit start-stop status variable $z_{g,t}$ determined in the first stage. The second and third items represent unit upward and downward ramp rate constraints. The fourth item represents a system power supply and demand balance constraint. The fifth item represents a transmission line power constraint. The sixth item represents a system wind energy curtailment constraint. The last item represents a system load shedding constraint.

The energy storage constraints can be expressed as follows:

$$\begin{cases} I_{s,t}^{sd} + I_{s,t}^{sc} \leq 1 \forall \, s \in S, \forall \, t \in T \\ I_{s,t}^{sd} p_{min}^{sd} \leq p_{s,t}^{sd} \leq I_{s,t}^{sd} p_{max}^{sd} \\ I_{s,t}^{sc} p_{min}^{sc} \leq p_{s,t}^{sc} \leq I_{s,t}^{sc} p_{max}^{sc} \\ SOC_{s,min} \leq SOC_{s,t} \leq SOC_{s,max} \\ SOC_{s,t} = SOC_{s,t-1} + \left( p_{s,t}^{sc} \eta_c - \dfrac{p_{s,t}^{sd}}{\eta_d} \right) \Big/ Q_{rate} \\ SOC_{s,T} = SOC_{s,0} \end{cases}$$

The formula for the energy storage constraints is the formula (7). In the formula, $p_{min}^{sd}$ and $p_{max}^{sd}$ represent minimum and maximum discharge power of the energy storage power station s, respectively; $p_{min}^{sc}$ and $p_{max}^{sc}$ represent minimum and maximum charge power of the energy storage power station s, respectively; $SOC_{s,t}$, $SOC_{s,min}$, and $SOC_{s,max}$ represent a charge amount at the time t, a minimum charge amount, and a maximum charge amount of the energy storage power station s, respectively; $\eta_c$ and $\eta_d$ represent energy storage charge and discharge efficiency, respectively; $Q_{rate}$ represents a rated capacity of an energy storage power station; and $SOC_{s,0}$, $SOC_{s,T}$ represent an initial and final charge amount of energy storage, respectively. The first item in the formula (7) represents the energy storage charge and discharge status constraint. The energy storage power station cannot charge and discharge at the same time. The second and third items represent the energy storage charge and discharge power constraints. The fourth item represents the energy storage charge constraint. The fifth item represents a relationship between charge amounts at adjacent times of energy storage. The last item is used to constrain that the final charge amount of energy storage is equal to the initial charge amount.

The optimal dispatching model for the wind power generation and energy storage combined system is constructed as $$\begin{cases} \min\limits_{u_{g,t}^{on}, u_{g,t}^{off}, z_{g,t}} \left( F_1 + \max\limits_{P_{g,t} \Delta W_{w,t} \Delta D_{d,t} I_{s,t}^{sc} I_{s,t}^{sd} p_{s,t}^{sd} p_{s,t}^{sc}} F_2 \right) \\ u_{g,t}^{on}, u_{g,t}^{off}, z_{g,t} \in C_1 \\ P_{g,t}, \Delta W_{w,t} \Delta D_{d,t}, I_{s,t}^{sc}, I_{s,t}^{sc}, p_{s,t}^{s,d}, p_{s,t}^{sc} \in C_2 \\ W_{w,t} \in U \end{cases}$$

based on the start-stop cost model and operating cost model by using the wind power uncertainty set as the wind power output constraint;

Where, $F_1$ represents a start-stop cost of the conventional unit, and $F_2$ represents a sum of an output cost, a wind energy curtailment cost, a load shedding cost, an energy storage cycle aging cost, and a charge and discharge cost of the conventional unit; $C_1$ and $C_2$ represent constraints of the start-stop cost model and operating cost model, respectively, and U represents the wind power uncertainty set, namely, the wind power output constraint; $u_{g,t}^{on}$ and $u_{g,t}^{off}$ are 0-1 variables that represent startup and shutdown of the unit g at the time t, where when $u_{g,t}^{on}=1$, the unit g changes from the shutdown state to a startup state at the time t, otherwise, the value is 0, and when $u_{g,t}^{off}=1$, the unit g changes from the startup state to the shutdown state; $z_{g,t}$ represents an operating status of the unit g at the time t, and if $z_{g,t}$ is 1, the unit g is in the operating state, otherwise, the unit g is in the shutdown state; $P_{g,t}$ represents a wind turbine output of the unit g at the time t; $\Delta W_{w,t}$, $\Delta D_{d,t}$ represent an amount of curtailed wind energy of the $w^{th}$ wind farm at the time t and a load shedding amount of the load d at the time t, respectively; $I_{s,t}^{sd}$, $I_{s,t}^{sc}$ represent binary variables, where $I_{s,t}^{sd}=1$ indicates that the energy storage power station S is in a discharge state at the time t, and $I_{s,t}^{sc}=1$ indicates it is in a charge state; and $p_{s,t}^{sd}$ and $p_{s,t}^{sc}$ represent a discharge capacity and charge capacity of the energy storage power station s at the time t, respectively.

To facilitate the description of the following solution steps, the foregoing two-stage robust model can be transformed into the following matrix shorthand expression:

$$\begin{cases} \min\limits_{x} c^T x + \max\limits_{u \in U} \min\limits_{y,z} d^T y + g^T z \\ \text{s.t.} \quad \begin{aligned} Ax &\leq b \\ Ey + Fz &\leq f - Hx - Gu \end{aligned} \end{cases}$$

Where x represents first-stage decision variables (decision variables of the start-stop cost model), including the unit startup and shutdown state variables and operating status variable $u_{g,t}^{on}$, $u_{g,t}^{off}$, and $z_{g,t}$; y represents a set of second-stage continuous decision variables (continuous decision variables of the operating cost model), including the unit output $P_{g,t}$, amount of curtailed wind energy $\Delta W_{w,t}$, load shedding amount $\Delta D_{d,t}$, and energy storage charge and discharge power $p_{s,t}^{sd}$ and $p_{s,t}^{sc}$; z represents the second-stage binary decision variables, namely, the status variables $I_{s,t}^{sc}$ and $I_{s,t}^{sd}$ of the energy storage power system; u represents the uncertainty variable; b, c, d, g, f, A, E, F, H, G represent a corresponding constant coefficient matrix; $c^T x$ represents the first-stage objective function, namely, the start-stop cost of the unit; Ax ≤ b represents the first-stage constraint condition; $d^T y + g^T z$ represents the second-stage objective function, namely, the sum of the unit output cost, wind energy curtailment cost, load shedding cost, energy storage cycle aging cost, and charge and discharge cost; and Ey+Fz≤f−Hx−Gu represents the second-stage constraint condition.

In step 103, since the model proposed in step 102 is a large-scale nonlinear programming problem, which is difficult to directly solve, with a large calculation amount and low calculation efficiency, the generating unit fuel cost, the aging cost of energy storage devices, and the constraint of the spatial-temporal uncertainty set are linearized firstly.

The model proposed in step 102 contains three nonlinear parts: the wind power uncertainty set $$U = \left\{ W_{w,t} \middle| W_{w,t}^l \leq W_{w,t} \leq W_{w,t}^u; \right.$$

$$\left. \sum_w \frac{|W_{w,t} - W_{w,t}^e|}{W_{w,t}^h} \leq \Gamma_w^S; \sum_t \frac{|W_{w,t} - W_{w,t}^e|}{W_{w,t}^h} \leq \Gamma_t^T, \forall w, t \right\}$$

in formula (1) containing absolute values, the output cost $\Sigma_{t=1}^T \Sigma_{g=1}^G (a_g P_{g,t}^2 + b_g P_{g,t} + c_g)$ of the conventional unit in formula (5) that is a quadratic function, and the energy storage cycle aging cost $\Sigma_{t=2}^T \Sigma_{s=1}^S \delta_{c,s}(I_{s,t}^{sd}(1-I_{s,t-1}^{sd})+I_{s,t}^{sc}(1-I_{s,t-1}^{sc}))$ containing nonlinear terms produced from multiplication of binary variables.

For the absolute values in the uncertainty set $$U = \left\{ W_{w,t} \middle| W_{w,t}^l \leq W_{w,t} \leq W_{w,t}^u; \right.$$

$$\left. \sum_w \frac{|W_{w,t} - W_{w,t}^e|}{W_{w,t}^h} \leq \Gamma_w^S; \sum_t \frac{|W_{w,t} - W_{w,t}^e|}{W_{w,t}^h} \leq \Gamma_t^T, \forall w, t \right\},$$

auxiliary variables $a_{w,t}$, $a_{w,t}^+$, $a_{w,t}^-$ are introduced, where $a_{w,t}^+$ indicates $a_{w,t} > 0$, and $a_{w,t}^-$ indicates $a_{w,t} < 0$. $a_{w,t}$ can be expressed as:

$$\begin{cases} a_{w,t} = W_{w,t} - W_{w,t}^S \\ a_{w,t} = a_{w,t}^+ - a_{w,t}^- \end{cases}$$

The absolute value constraints in uncertainty set are transformed into:

$$\begin{cases} \sum_w \frac{a_{w,t}^+ + a_{w,t}^-}{W_{w,t}^k} \leq \Gamma_w^S \forall t, \sum_t \frac{a_{w,t}^+ + a_{w,t}^-}{W_{w,t}^k} \leq \Gamma_t^T \forall w \\ -BM \cdot d_{w,t}^- \leq a_{w,t} \leq BM \cdot d_{w,t}^+ \\ 0 \leq a_{w,t}^+ \leq BM \cdot d_{w,t}^+ \\ 0 \leq a_{w,t}^- \leq BM \cdot d_{w,t}^- \\ d_{w,t}^+ + d_{w,t}^- = 1 \end{cases}$$

Where BM represents a positive number that is sufficiently large, and $d_{w,t}^+$, $d_{w,t}^-$ represent binary variables. If $a_{w,t} > 0$, $d_{w,t}^+ = 1$. Otherwise, if $a_{w,t} < 0$, $d_{w,t}^- = 1$.

For the quadratic function in the output cost $\Sigma_{t=1}^T \Sigma_{g=1}^G (a_g P_{g,t}^2 + b_g P_{g,t} + c_g)$ of the conventional unit, a piecewise linearization technology is adopted to handle the non-convexity of the model.

$$\begin{cases} f_g(P_{g,t}) = \sum_{m=1}^M K_{g,m} \eta_{g,t}^m + u_{g,t}(a_g \cdot P_g^{min\,2} + b_g P_g^{min} + c_g) \\ P_{g,t} = \sum_{m=1}^M \eta_{g,t}^m + u_{g,t} P_g^{min} \\ 0 \leq \eta_{g,t}^m \leq u_{g,t} \eta_g^{max} \\ \eta_g^{max} = (P_g^{max} - P_g^{min})/M \end{cases}$$

Where $K_{g,m}$ represents a slope of a linear function corresponding to an $m^{th}$ section of the unit g, $\eta_{g,t}^m$ represents a specific output of the $m^{th}$ section of the unit g at the time t, $\eta_g^{max}$ represents a maximum output of each section, and M represents a number of sections.

Binary variables $I_{s,t}^c = I_{s,t}^{sc} I_{s,t-1}^{sc}$ and $I_{s,t}^d = I_{s,t}^{sd} I_{s,t-1}^{sd}$ can be introduced to linearize the nonlinear terms produced from multiplication of the binary variables in the cycle aging cost $\Sigma_{t=2}^T \Sigma_{s=1}^S \delta_{c,s}(I_{s,t}^{sd}(1-I_{s,t-1}^{sd})+I_{s,t}^{sc}(1-I_{s,t-1}^{sc}))$ of the energy storage power system. However, corresponding constraint conditions need to be further added:

$$\begin{cases} 0 \leq I_{s,t}^c \leq I_{s,t}^{sc}, & I_{s,t}^c \leq I_{s,t-1}^{sc}, & I_{s,t}^c \geq I_{s,t}^{sc} + I_{s,t-1}^{sc} - 1 \\ 0 \leq I_{s,t}^d \leq I_{s,t}^{sd}, & I_{s,t}^d \leq I_{s,t-1}^{sd}, & I_{s,t}^d \geq I_{s,t}^{sd} + I_{s,t-1}^{sd} - 1 \end{cases}$$

In step 104, the linearized model is solved by using a nested C&CG strategy. The principle of the nested C&CG strategy is to use the C&CG algorithm in outer loops to transform the original problem into a main problem and a subproblem to be iteratively solved. In each iteration, a non-convex max-min subproblem is further decomposed into a main problem and a subproblem based on the similar principle to generate inner loops. Finally, the original problem is solved through iterative loops of the outer layer and the inner layer.

The outer C&CG loop decomposes the original problem into the main problem and subproblem. When the main problem is solved, a first-stage optimal solution set for a next inner loop iteration is obtained; then inner loop solution is performed on the subproblem, the outer upper bound is updated, and a worst scenario of an $m^{th}$ outer loop is obtained; and when a difference between upper and lower bounds is less than a specified threshold, the unit start-stop plan is output and the outer loop is stopped, otherwise, the corresponding constraints are added when the main problem is solved, and the number of iterations is updated to m=m+1 to continue the iteration.

The function of an inner C&CG loop is to identify the worst scenario under the optimal solution of the current main problem by solving the subproblem, which is a max-min problem in the following form:

$$\begin{cases} \max \min d^T y + g^T z \\ Ey + Fz \leq f - Hx^* - Gu, z \in \{0, 1\} \end{cases}.$$

Because the subproblem contains the binary variable z, the problem is non-convex, and a duality principle cannot be used to directly transform the model into a min problem. To effectively solve the problem, the subproblem can be further decomposed into an inner main problem and inner subproblem for iterative solution. The solution result shows that the conservativeness of the robust optimization model can be properly controlled by adjusting the value of a confidence parameter, and the applicability of the model is improved. The robust optimal dispatching model for a wind power generation and energy storage combined system considering the spatio-temporal uncertainty set is more in line with an actual operating scenario. This can promote wind power accommodation and ensure system economy. The use of the nested C&CG solution strategy improves the efficiency of solving the model.

The nested C&CG solution strategy includes the following steps:

(1) Transforming the original problem into the main problem and subproblem to be iteratively solved by using the C&CG algorithm in outer loops;

(2) In each iteration, decomposing the non-convex max-min subproblem into a main problem and a subproblem based on the similar principle to generate inner loops.

Figure 2:
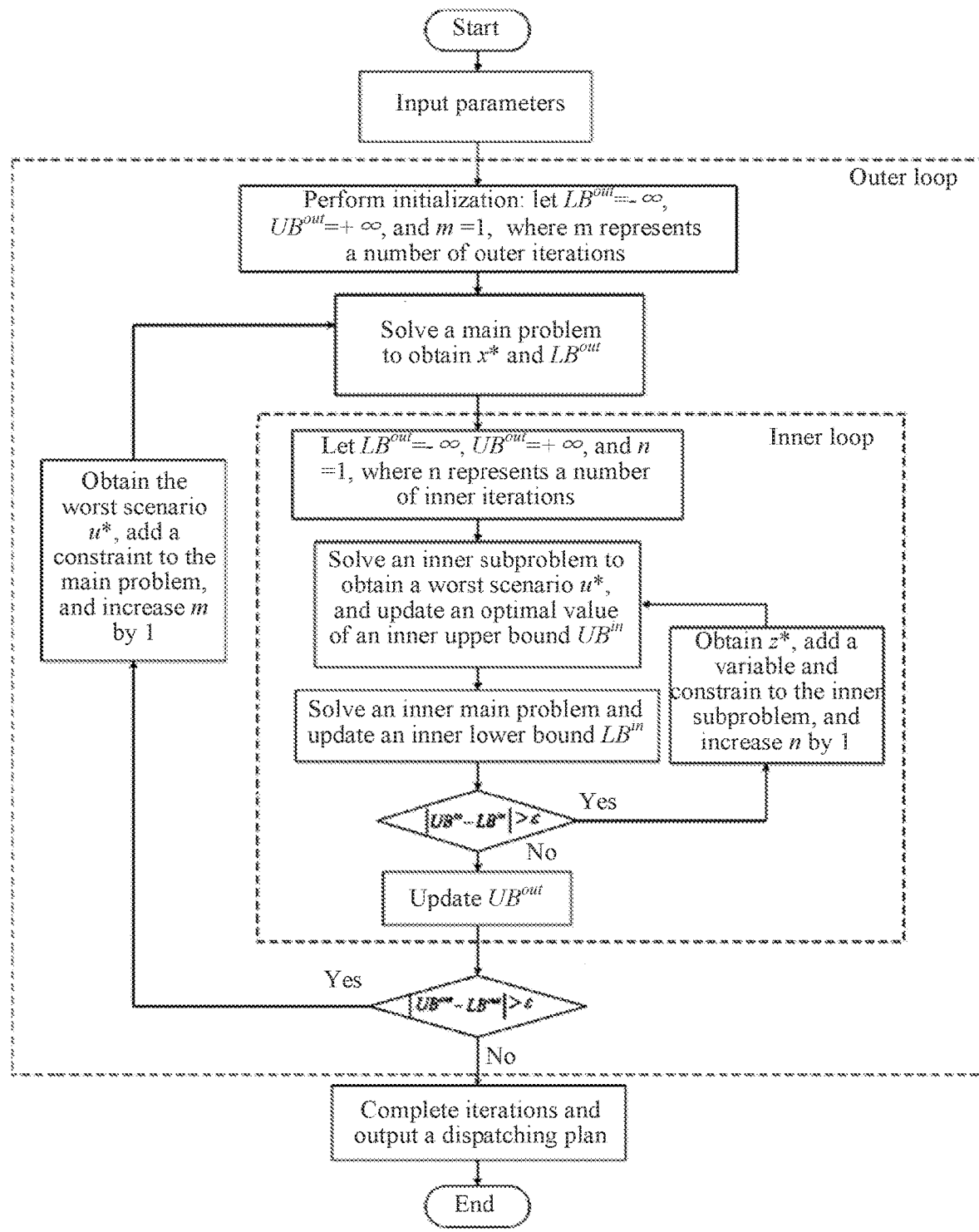
FIG. 2 is a flowchart of a nested C&CG solution strategy according to the present disclosure.

As shown in FIG. 2, a specific method is as follows.

The optimal dispatching model is divided into a first main problem optimization model $$\begin{cases} \min c^T x + \omega \\ Ax \leq b \\ \omega \geq d^T y^{(l)} + g^T z^{(l)} & \forall l \in m \\ Ey^{(l)} + Fz^{(l)} \leq f - Hx - Gu_*^{(l)}, & \forall l \in m \end{cases}$$

and a first subproblem optimization model $$\begin{cases} \max \min d^T y + g^T z \\ Ey + Fz \leq f - Hx^* - Gu, z \in \{0, 1\} \end{cases},$$

where x represents a decision variable of the start-stop cost model; y represents a continuous decision variable set of the operating cost model; z represents a binary decision variable of the operating cost model; $u_*$ represents an uncertainty variable in a worst scenario; b, c, d, g, f, A, E, F, H, G represent a corresponding constant coefficient matrix; $c^T x$ represents an objective function of the start-stop cost model; $Ax \leq b$ represents a constraint condition of the start-stop cost model; $d^T y + g^T z$ represents an objective function of the operating cost model, namely, the sum of the output cost, wind energy curtailment cost, load shedding cost, energy storage cycle aging cost, and charge and discharge cost of the unit; $Ey + Fz \leq f - Hx - Gu$ represents a constraint condition of the operating cost model; $\omega$ represents a variable that reflects a constraint of a first subproblem on a first main problem; l represents a variable that indicates a number of iterations of the main problem; $y^{(l)}$ represents a continuous decision variable in the first subproblem during an $l^{th}$ iteration; $z^{(l)}$ represents a binary decision variable in the first subproblem during the $l^{th}$ iteration; and $u_*$ represents an uncertainty variable in the worst scenario in the first subproblem during the $l^{th}$ a iteration.

An outer lower bound $LB^{out}$ is initialized to negative infinity, an outer upper bound $UB^{out}$ to positive infinity, and a number m of outer iterations to 1.

Outer loop solution is performed on the first main problem optimization model to obtain an optimal solution set x* of decision variables of the start-stop cost model and $\omega$* used for a next inner loop iteration, where w* is optimal $\omega$ obtained by solving the first main problem optimization model.

Inner loop solution is performed on the first subproblem optimization model to obtain a worst scenario $u_*^+$ during an $m^{th}$ outer loop.

The outer upper bound $UB^{out} = \min\{UB^{out}, c^T x^* + \omega^*\}$ is updated based on the optimal solution set x* of the decision variables of the start-stop cost model and $\omega$*.

It is determined whether an absolute value of a difference between the updated outer upper bound and the outer lower bound is greater than a difference threshold to obtain a first determination result.

If the first determination result is yes, $$\begin{cases} \omega \geq d^T y^{(m+1)} + g^T z^{(m+1)} \\ Ey^{(m+1)} + Fz^{(m+1)} \leq f - Hx - Gu_*^+ \end{cases}$$

as a constraint may be added into the first main problem optimization model, increasing the number of outer iterations by 1, and returning to the step of performing outer loop solution on the first main problem optimization model to obtain a first-stage optimal solution set x* and $\omega$* used for a next inner loop iteration, where $y^{(m+1)}$ represents a variable y used for an $(m+1)^{th}$ iteration; and $z^{(m+1)}$ represents a variable z used for the $(m+1)^{th}$ iteration.

If the first determination result is no, the optimal dispatching plan for the wind power generation and energy storage combined system considering the worst scenario $u_*^+$ is output.

Performing inner loop solution on the first subproblem optimization model to obtain the worst scenario $u_*^+$ during the $m^{th}$ outer loop may specifically include the following steps:

The first subproblem optimization model is divided into a second main problem optimization model $$\begin{cases} \min d^T y + g^T z \\ Ey + Fz \leq f - Hx^* - Gu^* \end{cases}$$

and a second subproblem optimization model $$\begin{cases} \max \theta \\ \theta \leq g^T z^{(k)} + (f - Hx^* - Gu - Fz^{(k)})^T \pi^{(k)}, \\ E^T \pi^{(k)} \leq d^T, \pi^{(k)} \geq 0, u \in U \forall k \leq n \end{cases}$$

where $\theta$ represents an objective function of a second subproblem; $z^{(k)}$ represents a binary decision variable in a second main problem during a $k^{th}$ iteration; and $\pi^{(k)}$ represents a dual variable during the $k^{th}$ iteration.

An inner upper bound $UB^{in}$ is initialized to positive infinity, an inner lower bound $LB^{in}$ to negative infinity, and a number n of inner iterations to 1.

The second subproblem optimization model is solved to obtain a worst scenario u* and an optimal value $UB^{in}=\theta^*$ of the inner upper bound.

The second main problem optimization model is solved based on the worst scenario u to obtain an optimal solution set y* of the continuous decision variable set of the operating cost model and an optimal solution set z* of the binary decision variable of the operating cost model.

The inner lower bound $LB^{in}=\max\{LB^{in}, d^Ty^*+g^Tz^*\}$ is updated based on the optimal solution set y* of the continuous decision variable set of the operating cost model and the optimal solution set z* of the binary decision variable of the operating cost model.

It is determined whether an absolute value of a difference between the inner upper bound and the updated inner lower bound is greater than a difference threshold to obtain a second determination result.

If the second ination result is yes, $$\begin{cases} \theta \leq g^T z^{(n+1)} + (f - Hx^* - Gu - Fz^{(n+1)})^T \pi^{(n+1)} \\ E^T \pi^{(n+1)} \leq d^T \end{cases}$$

is added as a constrain in the second subproblem optimization model, increasing the number of inner iterations by 1, and returning to the step of solving the second subproblem optimization model to obtain the worst scenario u* and the optimal value $UB^{in}=\theta^*$ of the inner upper bound, where $z^{(n+1)}$ represents a variable z for an $(n+1)^{th}$ iteration; and $\pi^{(n+1)}$ represents a dual variable for the $(n+1)^{th}$ iteration.

If the second determination result is no, the worst scenario u* is output.

Compared with the prior art, the present disclosure has the following advantages:

In the present disclosure, the uncertainty of the wind turbine output is characterized based on the spatio-temporal correlation of the wind turbine output and the interval uncertainty set. Compared with a traditional symmetric interval uncertainty set, the uncertainty set that considers spatio-temporal effects effectively excludes some extreme scenarios with a very small probability of occurrence and reduces the conservativeness of the model. The two-stage robust optimal dispatching model for the wind power generation and energy storage combined system is constructed based on charge and discharge characteristics of the energy storage unit, and the linearization technology and nested C&CG strategy are used to efficiently solve the model.

The uncertainty of the wind turbine output is characterized based on the interval uncertainty set. The uncertainty set with temporal-spatial effect being factored excludes some extreme scenarios with a very small probability of occurrence. The conservativeness of the robust optimal model can be properly controlled by adjusting the value of the confidence parameter, and the applicability and credibility of the model are improved. The linearization technology and nested C&CG strategy are employed for iterative solution, resolving the problems of a large scale of model solution and low solution efficiency. The result of the calculation example shows that the robust optimal dispatching model for the wind power generation and energy storage combined system considering the spatio-temporal uncertainty set is more in line with the actual operating scenario. This can promote wind power accommodation and ensure systematic economy.

The present disclosure resolves the problems of optimal dispatching of the wind power generation and energy storage combined system considering the wind power uncertainty. This strategy can not only take into account the economy and robustness of system operation, but also overcome the defect of a large calculation amount of a stochastic optimization method, thereby implementing high solution efficiency of the model.

The present disclosure further provides an optimal dispatching system for a wind power generation and energy storage combined system, including a wind power uncertainty set construction module, an optimal dispatching model construction module, a linearized optimal dispatching model obtaining module, and an optimal dispatching plan determining module.

The wind power uncertainty set construction module is configured to construct, based on spatio-temporal coupling of a wind turbine output, a wind power uncertainty set used to characterize uncertainty of the wind turbine output.

The optimal dispatching model construction module is configured to construct an optimal dispatching model for the wind power generation and energy storage combined system by using the wind power uncertainty set as a wind power output constraint.

The linearized optimal dispatching model obtaining module is configured to linearize the optimal dispatching model to obtain a linearized optimal dispatching model.

The optimal dispatching plan determining module is configured to solve the linearized optimal dispatching model by using a nested C&CG algorithm to determine an optimal dispatching plan for the wind power generation and energy storage combined system, and optimally dispatch the wind power generation and energy storage combined system according to the optimal dispatching plan.

The wind power uncertainty set construction module may specifically include a spatio-temporal uncertainty parameter determining submodule and a wind power uncertainty set construction submodule.

The spatio-temporal uncertainty parameter determining submodule is configured to determine spatio-temporal uncertainty parameters by using formulas $$\begin{cases} W^u_{w,t} - W^l_{w,t} = \Phi^{-1}\left(\frac{1+\alpha}{2}\right)\sigma_{w,t} \\ \Gamma^S_w = W\sqrt{\frac{\pi}{2}} + \sqrt{\frac{W(\pi-2)}{\pi}}\Phi^{-1}(\alpha) \\ \Gamma^T_t = T\sqrt{\frac{\pi}{2}} + \sqrt{\frac{T(\pi-2)}{\pi}}\Phi^{-1}(\alpha) \end{cases}$$

according to the Lindeberg-Levy central limit theorem, where $W_{w,t}^l$ and $W_{w,t}^u$ represent upper and lower output limits of a $w^{th}$ wind farm at a time t, respectively; $\Phi^{-1}(\cdot)$ represents an inverse function of a standard normal distribution cumulative probability density function; a represents a parameter used to adjust conservativeness of the set; $\sigma_{w,t}$ represents a variance of the $w^{th}$ wind farm at the time t; $\Gamma_w^S$ represents a spatial constraint parameter of output power of the $w^{th}$ wind farm; $\Gamma_t^T$ represents a time parameter of wind farm output power; W represents a number of wind farms; and T represents a dispatching period.

The wind power uncertainty set construction submodule is configured to construct, based on the spatio-temporal uncertainty parameters and spatio-temporal coupling of the wind turbine output, the wind power uncertainty set used to characterize the uncertainty of the wind turbine output as $$\begin{cases} U = \left\{ W_{w,t} \mid W_{w,t}^l \leq W_{w,t} \leq W_{w,t}^u; \sum_w \frac{|W_{w,t} - W_{w,t}^e|}{W_{w,t}^h} \leq \Gamma_w^S; \sum_t \frac{|W_{w,t} - W_{w,t}^e|}{W_{w,t}^h} \leq \Gamma_t^T, \forall w, t \right\} \\ W_{w,t}^e = 0.5(W_{w,t}^l + W_{w,t}^u) \\ W_{w,t}^h = 0.5(W_{w,t}^u - W_{w,t}^l) \end{cases};$$

Where U represents the wind power uncertainty set; and $W_{w,t}$, $W_{w,t}^e$, $W_{w,t}^h$ represent the output, an expected output, and a historical output of the $w^{th}$ wind farm at the time t.

The optimal dispatching model construction module may specifically include a start-stop cost model construction submodule, an operating cost model construction submodule and an optimal dispatching model construction submodule.

The start-stop cost model construction submodule is configured to construct a start-stop cost model for a conventional unit in the wind power generation and energy storage combined system by using a unit start-stop status and minimum start-stop duration as constraint conditions.

The operating cost model construction submodule is configured to construct an operating cost model for the conventional unit in the wind power generation and energy storage combined system based on the start-stop cost model by using a grid operating constraint and an energy storage constraint as constraint conditions.

The optimal dispatching model construction submodule is configured to construct the optimal dispatching model for the wind power generation and energy storage combined system as $$\begin{cases} \min_{u_{g,t}^{on}, u_{g,t}^{off}, z_{g,t}} \left( F_1 + \max_{P_{g,z}, \Delta D_{d,t}, I_{s,t}^{sc}, I_{s,t}^{sd}, p_{s,t}^{sd}, p_{s,t}^{sc}} F_2 \right) \\ u_{g,t}^{on}, u_{g,t}^{off}, z_{g,t} \in C_1 \\ P_{g,t}, \Delta W_{w,t}, \Delta D_{d,t}, I_{s,t}^{sc}, I_{s,t}^{sd}, p_{s,t}^{sd}, p_{s,t}^{sc} \in C_2 \\ W_{w,t} \in U \end{cases}$$

based on the start-stop cost model and operating cost model by using the wind power uncertainty set as the wind power output constraint;

Where $F_1$ represents a start-stop cost of the conventional unit, and $F_2$ represents a sum of an output cost, a wind energy curtailment cost, a load shedding cost, an energy storage cycle aging cost, and a charge and discharge cost of the conventional unit; $C_1$ and $C_2$ represent constraints of the start-stop cost model and operating cost model, respectively, and U represents the wind power uncertainty set, namely, the wind power output constraint; $u_{g,t}^{on}$ and $u_{g,t}^{off}$ are 0-1 variables that represent startup and shutdown of a unit g at a time t, where when $u_{g,t}^{on}=1$, the unit g changes from a shutdown state to a startup state at the time t, otherwise, the value is 0, and when $u_{g,t}^{off}=1$, the unit g changes from the startup state to the shutdown state; $z_{g,t}$ represents an operating status of the unit g at the time t, and if $z_{g,t}$ is 1, the unit g is in an operating state, otherwise, the unit g is in the shutdown state; $P_{g,t}$ represents a wind turbine output of the unit g at the time t; $\Delta W_{w,t}$, $\Delta D_{d,t}$ represent an amount of curtailed wind energy of the $w^{th}$ wind farm at the time t and a load shedding amount of a load d at the time t, respectively; $I_{s,t}^{sd}$, $I_{s,t}^{sc}$ represent binary variables, where $I_{s,t}^{sd}=1$ indicates that an energy storage power station s is in a discharge state at the time t, and $I_{s,t}^{sc}=1$ indicates it is in a charge state; and $p_{s,t}^{sd}$ and $p_{s,t}^{sc}$ represent a discharge capacity and charge capacity of the energy storage power station s at the time t, respectively.

The optimal dispatching plan determining module may specifically include a first main problem optimization model and first subproblem optimization model division submodule, an outer layer initialization submodule, a decision variable optimal solution set obtaining submodule, a worst scenario obtaining submodule, an outer upper bound update submodule, a first determination result obtaining submodule, a constraint adding submodule, and an optimal dispatching plan output submodule.

The first main problem optimization model and first subproblem optimization model division submodule is configured to divide the optimal dispatching model into a first main problem optimization model $$\begin{cases} \min c^T x + \omega \\ Ax \leq b \\ \omega \geq d^T y^{(l)} + g^T z^{(l)} \forall l \in m \\ Ey^{(l)} + Fz^{(l)} \leq f - Hx - Gu_*^{(l)} \forall l \in m \end{cases}$$

and a first subproblem optimization model $$\begin{cases} \max \min d^T y + g^T z \\ Ey + Fz \leq f - Hx^* - Gu, z \in \{0, 1\} \end{cases},$$

where x represents a decision variable of the start-stop cost model; Y represents a continuous decision variable set of the operating cost model; z represents a binary decision variable of the operating cost model; $u_*$ represents an uncertainty variable in a worst scenario; b, c, d, g, f, A, E, F, H, G represent a corresponding constant coefficient matrix; $C^T x$ represents an objective function of the start-stop cost model; $Ax \leq b$ represents a constraint condition of the start-stop cost model; $d^T y + g^T z$ represents an objective function of the operating cost model, namely, the sum of the output cost, wind energy curtailment cost, load shedding cost, energy storage cycle aging cost, and charge and discharge cost of the unit; $Ey + Fz \leq f - Hx - Gu$ represents a constraint condition of the operating cost model; w represents a variable that reflects a constraint of a first subproblem on a first main problem; l represents a variable that indicates a number of iterations of the main problem; $y^{(l)}$ represents a continuous decision variable in the first subproblem during an $l^{th}$ iteration; $z^{(l)}$ represents a binary decision variable in the first subproblem during the $l^{th}$ iteration; and $u_*^{(l)}$ represents an uncertainty variable in the worst scenario in the first subproblem during the $l^{th}$ iteration.

The outer layer initialization submodule is configured to initialize an outer lower bound $LB^{out}$ to negative infinity, an outer upper bound $UB^{out}$ to positive infinity, and a number m of outer iterations to 1.

The decision variable optimal solution set obtaining submodule is configured to perform outer loop solution on the first main problem optimization model to obtain an optimal solution set x* of decision variables of the start-stop cost model and ω* used for a next inner loop iteration, where ω* is optimal ω obtained by solving the first main problem optimization model.

The worst scenario obtaining submodule is configured to perform inner loop solution on the first subproblem optimization model to obtain a worst scenario $u_*^+$ during an $m^{th}$ outer loop.

The outer upper bound update submodule is configured to update the outer upper bound $UB^{out}=\min\{UB^{out}, c^Tx^*+\omega^*\}$ based on the optimal solution set x* of the decision variables of the start-stop cost model and ω*.

The first determination result obtaining submodule is configured to determine whether an absolute value of a difference between the updated outer upper bound and the outer lower bound is greater than a difference threshold to obtain a first determination result.

The constraint adding submodule is configured to: if the first determination result is yes, add $$\begin{cases} \omega \geq d^T y^{(m+1)} + g^T z^{(m+1)} \\ Ey^{(m+1)} + Fz^{(m+1)} \leq f - Hx - Gu_*^+ \end{cases}$$

as a constraint to the first main problem optimization model, increase the number of outer iterations by 1, and return to the step of performing outer loop solution on the first main problem optimization model to obtain a first-stage optimal solution set x* and ω* used for a next inner loop iteration, where $y^{(m+1)}$ represents a variable y used for an $(m+1)^{th}$ iteration; and $z^{(m+1)}$ represents a variable z used for the $(m+1)^{th}$ iteration.

The optimal dispatching plan output submodule, configured to: if the first determination result is no, output the optimal dispatching plan for the wind power generation and energy storage combined system considering the worst scenario $u_*^+$.

The worst scenario obtaining submodule may specifically include a second main problem optimization model and second subproblem optimization model division unit, an inner layer initialization unit, an inner upper bound optimal value obtaining unit, a second main problem optimization model solution unit, an inner lower bound update unit, a second determination result obtaining unit, a constraint adding unit and a worst scenario output unit.

The second main problem optimization model and second subproblem optimization model division unit is configured to divide the first subproblem optimization model into a second main problem optimization model $$\begin{cases} \min d^T y + g^T z \\ Ey + Fz \leq f - Hx^* - Gu^* \end{cases}$$

and a second subproblem optimization model $$\begin{cases} \max \theta \\ \theta \leq g^T z^{(k)} + (f - Hx^* - Gu - Fz^{(k)})^T \pi^{(k)}, \\ E^T \pi^{(k)} \leq d^T, \pi^{(k)} \geq 0, u \in U \forall k \leq n \end{cases}$$

where θ represents an objective function of a second subproblem; $z^{(k)}$ represents a binary decision variable in a second main problem during a $k^{th}$ iteration; and $\pi^{(k)}$ represents a dual variable during the $k^{th}$ iteration.

The inner layer initialization unit is configured to initialize an inner upper bound $UB^{in}$ to positive infinity, an inner lower bound $LB^{in}$ to negative infinity, and a number n of inner iterations to 1.

The inner upper bound optimal value obtaining unit is configured to solve the second subproblem optimization model to obtain a worst scenario u* and an optimal value $UB^{in}=\theta^*$ of the inner upper bound.

The second main problem optimization model solution unit is configured to solve the second main problem optimization model based on the worst scenario u* to obtain an optimal solution set y* of the continuous decision variable set of the operating cost model and an optimal solution set z* of the binary decision variable of the operating cost model.

The inner lower bound update unit is configured to update the inner lower bound $LB^{in}=\max\{LB^{in}, d^Ty^*+g^Tz^*\}$ based on the optimal solution set y* of the continuous decision variable set of the operating cost model and the optimal solution set z* of the binary decision variable of the operating cost model.

The second determination result obtaining unit is configured to determine whether an absolute value of a difference between the inner upper bound and the updated inner lower bound is greater than a difference threshold to obtain a second determination result.

The constraint adding unit is configured to: if the second determination result is yes, add $$\begin{cases} \theta \leq g^T z^{(n+1)} + (f - Hx^* - Gu - Fz^{(n+1)})^T \pi^{(n+1)} \\ E^T \pi^{(n+1)} \leq d^T \end{cases}$$

as a constraint to the second subproblem optimization model, increase the number of inner iterations by 1, and return to the step of solving the second subproblem optimization model to obtain the worst scenario u* and the optimal value $UB^{in}=\theta^*$ of the inner upper bound, where $z^{(n+1)}$ represents a variable z for an $(n+1)^{th}$ iteration and $\pi^{(n+1)}$ represents a dual variable for the $(n+1)^{th}$ iteration.

The worst scenario output unit is configured to: if the second determination result is no, output the worst scenario u*.

Each embodiment of this specification is described in a progressive manner, each embodiment focuses on the difference from other embodiments, and the same and similar parts between the embodiments may refer to each other. For the system disclosed in the embodiments, since the system corresponds to the method disclosed in the embodiments, the description is relatively simple, and reference can be made to the method description.

In this specification, several specific embodiments are used for illustration of the principles and implementations of the present disclosure. The description of the foregoing embodiments is used to help illustrate the method of the present disclosure and the core ideas thereof. In addition, persons of ordinary skill in the art can make various modifications in terms of specific implementations and the scope of application in accordance with the ideas of the present disclosure. In conclusion, the content of this specification shall not be construed as a limitation to the present disclosure.

What is claimed is:

1. An optimal dispatching method for a wind power generation and energy storage combined system, comprising:
   constructing, based on spatio-temporal coupling of a wind turbine output, a wind power uncertainty set used to characterize uncertainty of the wind turbine output;
   constructing an optimal dispatching model for the wind power generation and energy storage combined system by using the wind power uncertainty set as a wind power output constraint;
   linearizing the optimal dispatching model to obtain a linearized optimal dispatching model; and
   solving the linearized optimal dispatching model in a nested manner by using a column-and-constraint generation (C&CG) algorithm to determine an optimal dispatching plan for the wind power generation and energy storage combined system, and optimally dispatching the wind power generation and energy storage combined system according to the optimal dispatching plan.

2. The optimal dispatching method for a wind power generation and energy storage combined system according to claim 1, wherein the constructing, based on spatio-temporal coupling of a wind turbine output, a wind power uncertainty set used to characterize uncertainty of the wind turbine output comprises:
   determining spatio-temporal uncertainty parameters by using formulas $$\begin{cases} W_{w,t}^u - W_{w,t}^l = \Phi^{-1}\left(\frac{1+\alpha}{2}\right)\sigma_{w,t} \\ \Gamma_w^S = W\sqrt{\frac{\pi}{2}} + \sqrt{\frac{W(\pi-2)}{\pi}}\Phi^{-1}(\alpha) \\ \Gamma_t^T = T\sqrt{\frac{\pi}{2}} + \sqrt{\frac{T(\pi-2)}{\pi}}\Phi^{-1}(\alpha) \end{cases}$$

according to the Lindeberg-Levy central limit theorem, wherein $W_{w,t}^u$ and $W_{w,t}^l$ represent upper and lower output limits of a $w^{th}$ wind farm at a time t, respectively; $\Phi^{-1}(\cdot)$ represents an inverse function of a standard normal distribution cumulative probability density function; a represents α parameter used to adjust conservativeness of the set; $\sigma_{w,t}$ represents a variance of the $w^{th}$ wind farm at the time t; $\Gamma_w^S$ represents a spatial constraint parameter of output power of the $w^{th}$ wind farm; $\Gamma_t^T$ represents a time parameter of wind farm output power; W represents a number of wind farms; and T represents a dispatching period; and
   constructing, based on the spatio-temporal uncertainty parameters and spatio-temporal coupling of the wind turbine output, the wind power uncertainty set used to characterize the uncertainty of the wind turbine output as $$\begin{cases} U = \left\{ W_{w,t} \mid W_{w,t}^l \leq W_{w,t} \leq W_{w,t}^u; \sum_w \frac{|W_{w,t} - W_{w,t}^e|}{W_{w,t}^h} \leq \Gamma_w^S; \sum_t \frac{|W_{w,t} - W_{w,t}^e|}{W_{w,t}^h} \leq \Gamma_t^T, \forall w, t \right\} \\ W_{w,t}^e = 0.5(W_{w,t}^l + W_{w,t}^u) \\ W_{w,t}^h = 0.5(W_{w,t}^u - W_{w,t}^l) \end{cases};$$

wherein U represents the wind power uncertainty set; and $W_{w,t}$, $W_{w,t}^e$, $W_{w,t}^h$ represent the output, an expected output, and a historical output of the $w^{th}$ wind farm at the time t.

3. The optimal dispatching method for a wind power generation and energy storage combined system according to claim 1, wherein the constructing an optimal dispatching model for the wind power generation and energy storage combined system by using the wind power uncertainty set as a wind power output constraint comprises:
   constructing a start-stop cost model for a conventional unit in the wind power generation and energy storage combined system by using a unit start-stop status and minimum start-stop duration as constraint conditions;
   constructing an operating cost model for the conventional unit in the wind power generation and energy storage combined system based on the start-stop cost model by using a grid operating constraint and an energy storage constraint as constraint conditions; and
   constructing the optimal dispatching model for the wind power generation and energy storage combined system as $$\begin{cases} \min\limits_{u_{g,t}^{on}, u_{g,t}^{off}, z_{g,t}} \left( F_1 + \max\limits_{P_{g,z}, \Delta D_{d,t}, I_{s,t}^{sc}, I_{s,t}^{sd}, p_{s,t}^{sd}, p_{s,t}^{sc}} F_2 \right) \\ u_{g,t}^{on}, u_{g,t}^{off}, z_{g,t} \in C_1 \\ P_{g,t}, \Delta W_{w,t}, \Delta D_{d,t}, I_{s,t}^{sc}, I_{s,t}^{sd}, p_{s,t}^{sd}, p_{s,t}^{sc} \in C_2 \\ W_{w,t} \in U \end{cases}$$

based on the start-stop cost model and operating cost model by using the wind power uncertainty set as the wind power output constraint;
   wherein $F_1$ represents a start-stop cost of the conventional unit, and $F_2$ represents a sum of an output cost, a wind energy curtailment cost, a load shedding cost, an energy storage cycle aging cost, and a charge and discharge cost of the conventional unit; $C_1$ and $C_2$ represent constraints of the start-stop cost model and operating cost model, respectively, and U represents the wind power uncertainty set, namely, the wind power output constraint; $u_{g,t}^{on}$ and $u_{g,t}^{off}$ are 0-1 variables that represent startup and shutdown of a unit g at a time t, wherein when $u_{g,t}^{on}=1$, the unit g changes from a shutdown state to a startup state at the time t, otherwise, the value is 0, and when $u_{g,t}^{off}=1$, the unit g changes from the startup state to the shutdown state; $z_{g,t}$ represents an operating status of the unit g at the time t, and if $z_{g,t}$ is 1, the unit g is in an operating state, otherwise, the unit g is in the shutdown state; $P_{g,t}$ represents a wind turbine output of the unit g at the time t; $\Delta W_{w,t}$, $\Delta D_{d,t}$ represent an amount of curtailed wind energy of the $w^{th}$ wind farm at the time t and a load shedding amount of a load d at the time t, respectively; $I_{s,t}^{sd}$, $I_{s,t}^{sc}$ represent binary variables, wherein $I_{s,t}^{sd}=1$ indicates that an energy storage power station s is in a discharge state at the time t, and $I_{s,t}^{sc}=1$ indicates it is in a charge state; and $p_{s,t}^{sd}$ and $p_{s,t}^{sc}$ represent a discharge capacity and charge capacity of the energy storage power station s at the time t, respectively.

4. The optimal dispatching method for a wind power generation and energy storage combined system according to claim 3, wherein the solving the linearized optimal dispatching model in a nested manner by using a C&CG algorithm to determine an optimal dispatching plan for the wind power generation and energy storage combined system comprises:

dividing the optimal dispatching model into a first main problem optimization model $$\begin{cases} \min c^T x + w \\ Ax \le b \\ \omega \ge d^T y^l + g^T z^l & \forall l \in m \\ Ey^l + Fz^{(l)} \le f - Hx - Gu_*^{(l)} & \forall l \in m \end{cases}$$

and a first subproblem optimization model $$\begin{cases} \max \min d^T y + g^T z \\ Ey^{(l)} + Fz^{(l)} \le f - Hz^* - Gu, z \in \{0, 1\} \end{cases},$$

wherein x represents a decision variable of the start-stop cost model; y represents a continuous decision variable set of the operating cost model; z represents a binary decision variable of the operating cost model; $u_*$ represents an uncertainty variable in a worst scenario; b, c, d, g, f, A, E, F, H, G represent a corresponding constant coefficient matrix; $c^T x$ represents an objective function of the start-stop cost model; $Ax \le b$ represents a constraint condition of the start-stop cost model; $d^T y + g^T z$ represents an objective function of the operating cost model, namely, the sum of the output cost, wind energy curtailment cost, load shedding cost, energy storage cycle aging cost, and charge and discharge cost of the unit; $Ey+Fz \le f-Hx-Gu$ represents a constraint condition of the operating cost model; $\omega$ represents a variable that reflects a constraint of a first subproblem on a first main problem; l represents a variable that indicates a number of iterations of the main problem; $y^{(l)}$ represents a continuous decision variable in the first subproblem during an $l^{th}$ iteration; $z^{(l)}$ represents a binary decision variable in the first subproblem during the $l^{th}$ iteration; and $u_*^{(l)}$ represents an uncertainty variable in the worst scenario in the first subproblem during the $l^{th}$ iteration;

initializing an outer lower bound $LB^{out}$ to negative infinity, an outer upper bound $UB^{out}$ to positive infinity, and a number m of outer iterations to 1;

performing outer loop solution on the first main problem optimization model to obtain an optimal solution set x* of decision variables of the start-stop cost model and $\omega^*$ used for a next inner loop iteration, wherein $\omega^*$ is optimal $\omega$ obtained by solving the first main problem optimization model;

performing inner loop solution on the first subproblem optimization model to obtain a worst scenario $u_*^+$ during an $m^{th}$ outer loop;

updating the outer upper bound $UB^{out}=\min\{UB^{out}, c^T x^*+\omega^*\}$ based on the optimal solution set x* of the decision variables of the start-stop cost model and $\omega^*$;

determining whether an absolute value of a difference between the updated outer upper bound and the outer lower bound is greater than a difference threshold to obtain a first determination result; and if the first determination result is yes, adding $$\begin{cases} \omega \ge d^T y^{(m+1)} + g^T z^{(m+1)} \\ Ey^{(m+1)} + Fz^{(m+1)} \le f - Hx - Gu_*^+ \end{cases}$$

as a constraint into the first main problem optimization model, increasing the number of outer iterations by 1, and returning to the step of performing outer loop solution on the first main problem optimization model to obtain a first-stage optimal solution set x* and $\omega^*$ used for a next inner loop iteration, wherein $y^{(m+1)}$ represents a variable y used for an $(m+1)^{th}$ iteration; and $z^{(m+1)}$ represents a variable z used for the $(m+1)^{th}$ iteration; or if the first determination result is no, outputting the optimal dispatching plan for the wind power generation and energy storage combined system considering the worst scenario $u_*^+$.

5. The optimal dispatching method for a wind power generation and energy storage combined system according to claim 4, wherein the performing inner loop solution on the first subproblem optimization model to obtain a worst scenario $u_*^+$ during an $m^{th}$ outer loop comprises:

dividing the first subproblem optimization model into a second main problem optimization model $$\begin{cases} \min d^T y + g^T z \\ Ey + Fz \le f - Hz^* - Gu^* \end{cases}$$

and a second subproblem optimization model $$\begin{cases} \max \theta \\ \theta \le g^T z^{(k)} + (f - Hx^* - Gu - Fz^{(k)})^T \pi^{(k)}, \\ E^T \pi^{(k)} < d^T, \pi^{(k)} > 0, u \in U \forall k < n \end{cases}$$

wherein $\theta$ represents an objective function of a second subproblem; $z^{(k)}$ represents a binary decision variable in a second main problem during a $k^{th}$ iteration; and $\pi^{(k)}$ represents a dual variable during the $k^{th}$ iteration;

initializing an inner upper bound $UB^{in}$ to positive infinity, an inner lower bound $LB^{in}$ to negative infinity, and a number n of inner iterations to 1;

solving the second subproblem optimization model to obtain a worst scenario u* and an optimal value $UB^{in}=\theta^*$ of the inner upper bound;

solving the second main problem optimization model based on the worst scenario u* to obtain an optimal solution set y* of the continuous decision variable set of the operating cost model and an optimal solution set z* of the binary decision variable of the operating cost model;

updating the inner lower bound $LB^{in}=\max\{LB^{in}, d^T y^*+g^T z^*\}$ based on the optimal solution set y* of the continuous decision variable set of the operating cost model and the optimal solution set z* of the binary decision variable of the operating cost model;

determining whether an absolute value of a difference between the inner upper bound and the updated inner lower bound is greater than a difference threshold to obtain a second determination result; and if the second determination result is yes, adding $$\begin{cases} \theta \le g^T z^{(n+1)} + \left(f - Hx^* - Gu - Fz^{(n+1)}\right)^T \pi^{(n+1)} \\ E^T \pi^{(n+1)} \le d^T \end{cases}$$

as a constraint into the send subproblem optimization model, increasing the number of inner iterations by 1, and returning to the step of solving the second subproblem optimization model to obtain the worst scenario u* and the optimal value $UB^{in}=\theta^*$ of the inner upper bound, wherein $z^{(n+1)}$ represents a variable z for an $(n+1)^{th}$ iteration; and $\pi^{(n+1)}$ represents a dual variable for the $(n-1)^{th}$ iteration; or if the second determination result is no, outputting the worst scenario u*.

6. An optimal dispatching system for a wind power generation and energy storage combined system, comprising:

a wind power uncertainty set construction module, configured to construct, based on spatio-temporal coupling of a wind turbine output, a wind power uncertainty set used to characterize uncertainty of the wind turbine output;

an optimal dispatching model construction module, configured to construct an optimal dispatching model for the wind power generation and energy storage combined system by using the wind power uncertainty set as a wind power output constraint;

a linearized optimal dispatching model obtaining module, configured to linearize the optimal dispatching model to obtain a linearized optimal dispatching model; and an optimal dispatching plan determining module, configured to solve the linearized optimal dispatching model in a nested manner by using a column-and-constraint generation (C&CG) algorithm to determine an optimal dispatching plan for the wind power generation and energy storage combined system, and optimally dispatch the wind power generation and energy storage combined system according to the optimal dispatching plan.

7. The optimal dispatching system for a wind power generation and energy storage combined system according to claim 6, wherein the wind power uncertainty set construction module comprises:

a spatio-temporal uncertainty parameter determining submodule, configured to determine spatio-temporal uncertainty parameters by using formulas $$\begin{cases} W_{w,t}^u - W_{w,t}^l = \Phi^{-1}\left(\frac{1+\alpha}{2}\right)\sigma_{w,t} \\ \Gamma_w^S = W\sqrt{\frac{\pi}{2}} + \sqrt{\frac{W(\pi-2)}{\pi}}\Phi^{-1}(\alpha) \\ \Gamma_t^T = T\sqrt{\frac{\pi}{2}} + \sqrt{\frac{T(\pi-2)}{\pi}}\Phi^{-1}(\alpha) \end{cases}$$

according to the Lindeberg-Levy central limit theorem, wherein $W_{w,t}^l$ and $W_{w,t}^u$ represent upper and lower output limits of a $w^{th}$ wind farm at a time t, respectively; $\Phi^{-1}(\cdot)$ represents an inverse function of a standard normal distribution cumulative probability density function; $\alpha$ represents a parameter used to adjust conservativeness of the set; $\sigma_{w,t}$ represents a variance of the $w^{th}$ wind farm at the time t; $\Gamma_w^S$ represents a spatial constraint parameter of output power of the $w^{th}$ wind farm; $\Gamma_t^T$ represents a time parameter of wind farm output power; W represents a number of wind farms; and T represents a dispatching period; and a wind power uncertainty set construction submodule, configured to construct, based on the spatio-temporal uncertainty parameters and spatio-temporal coupling of the wind turbine output, the wind power uncertainty set used to characterize the uncertainty of the wind turbine output as $$\begin{cases} U = \left\{W_{w,t} \middle| W_{w,t}^l \le W_{w,t} \le W_{w,t}^u; \sum_w \frac{|W_{w,t} - W_{w,t}^e|}{W_{w,t}^h} \le \Gamma_w^S; \sum_t \frac{|W_{w,t} - W_{w,t}^e|}{W_{w,t}^h} \le \Gamma_t^T, \forall w, t\right\} \\ W_{w,t}^e = 0.5\left(W_{w,t}^l + W_{w,t}^u\right) \\ W_{w,t}^h = 0.5\left(W_{w,t}^u + W_{w,t}^l\right) \end{cases};$$

wherein U represents the wind power uncertainty set; and $W_{w,t}$, $W_{w,t}^e$, $W_{w,t}^h$ represent the output, an expected output, and a historical output of the $w^{th}$ wind farm at the time t.

8. The optimal dispatching system for a wind power generation and energy storage combined system according to claim 6, wherein the optimal dispatching model construction module comprises:

a start-stop cost model construction submodule, configured to construct a start-stop cost model for a conventional unit in the wind power generation and energy storage combined system by using a unit start-stop status and minimum start-stop duration as constraint conditions;

an operating cost model construction submodule, configured to construct an operating cost model for the conventional unit in the wind power generation and energy storage combined system based on the start-stop cost model by using a grid operating constraint and an energy storage constraint as constraint conditions; and an optimal dispatching model construction submodule, configured to construct the optimal dispatching model for the wind power generation and energy storage combined system as $$\begin{cases} \min_{u_{g,t}^{on}, u_{g,t}^{off}, z_{g,t}} \left(F_1 + \max_{P_{g,t}, \Delta W_{w,t}, \Delta D_{d,t}, I_{s,t}^{sc}, I_{s,t}^{sd}, p_{s,t}^{sd}, p_{s,t}^{sc}} F_2\right) \\ u_{g,t}^{on}, u_{g,t}^{off}, z_{g,t} \in C_1 \\ P_{g,t}, \Delta W_{w,t}, \Delta D_{d,t}, I_{s,t}^{sc}, I_{s,t}^{sd}, p_{s,t}^{sd}, p_{s,t}^{sc} \in C_2 \\ W_{w,t} \in U \end{cases}$$

based on the start-stop cost model and operating cost model by using the wind power uncertainty set as the wind power output constraint;

wherein $F_1$ represents a start-stop cost of the conventional unit, and $F_2$ represents a sum of an output cost, a wind energy curtailment cost, a load shedding cost, an energy storage cycle aging cost, and a charge and discharge cost of the conventional unit; $C_1$ and $C_2$ represent constraints of the start-stop cost model and operating cost model, respectively, and U represents the wind power uncertainty set, namely, the wind power output constraint; $u_{g,t}^{on}$ and $u_{g,t}^{off}$ are 0-1 variables that represent startup and shutdown of a unit g at a time t, wherein when $u_{g,t}^{on}=1$, the unit g changes from a shutdown state to a startup state at the time t, otherwise, the value is 0, and when $u_{g,t}^{off}=1$, the unit g changes from the startup state to the shutdown state; $z_{g,t}$ represents an operating status of the unit g at the time t, and if $z_{g,t}$ is 1, the unit g is in an operating state, otherwise, the unit g is in the shutdown state; $P_{g,t}$ represents a wind turbine output of the unit g at the time t, $\Delta W_{w,t}$, $\Delta D_{d,t}$ represent an amount of curtailed wind energy of the $w^{th}$ wind farm at the time t and a load shedding amount of the load d at the time t, respectively; $I_{s,t}^{sd}$, $I_{s,t}^{sc}$ represent binary variables, wherein $I_{s,t}^{sd}=1$ indicates that the energy storage power station s is in a discharge state at the time t, and $I_{s,t}^{sc}=1$ indicates it is in a charge state; and $p_{s,t}^{sd}$ and $p_{s,t}^{sc}$ represent a discharge capacity and charge capacity of the energy storage power station s at the time t, respectively.

9. The optimal dispatching system for a wind power generation and energy storage combined system according to claim 8, wherein the optimal dispatching plan determining module comprises:

a first main problem optimization model and first subproblem optimization model division submodule, configured to divide the optimal dispatching model into a first main problem optimization model $$\begin{cases} \min c^T x + w \\ Ax \le b \\ \omega \ge d^T y^{(l)} + g^T z^{(l)} & \forall l \in m \\ Ey^{(l)} + Fz^{(l)} \le f - Hx - Gu_*^{(l)} & \forall l \in m \end{cases}$$

and a first subproblem optimization model $$\begin{cases} \max \min d^T y + g^T z \\ Ey + Fz \le f \ Hx^* - Gu, z \in \{0, 1\} \end{cases},$$

wherein x represents a decision variable of the start-stop cost model; y represents a continuous decision variable set of the operating cost model; z represents a binary decision variable of the operating cost model; $u_*$ represents an uncertainty variable in a worst scenario; b, c, d, g, f, A, E, F, H, G represent a corresponding constant coefficient matrix; $c^T x$ represents an objective function of the start-stop cost model; $Ax \le b$ represents a constraint condition of the start-stop cost model; $d^T y + g^T z$ represents an objective function of the operating cost model, namely, the sum of the output cost, wind energy curtailment cost, load shedding cost, energy storage cycle aging cost, and charge and discharge cost of the unit; $Ey+Fz \le f-Hx-Gu$ represents a constraint condition of the operating cost model; $\omega$ represents a variable that reflects a constraint of a first subproblem on a first main problem; l represents a variable that indicates a number of iterations of the main problem; $y^{(l)}$ represents a continuous decision variable in the first subproblem during an $l^{th}$ iteration; $z^{(l)}$ represents a binary decision variable in the first subproblem during the $l^{th}$ iteration; and $u_*^{(l)}$ represents an uncertainty variable in the worst scenario in the first subproblem during the $l^{th}$ iteration;

an outer layer initialization submodule, configured to initialize an outer lower bound $LB^{out}$ to negative infinity, an outer upper bound $UB^{out}$ to positive infinity, and a number m of outer iterations to 1;

a decision variable optimal solution set obtaining submodule, configured to perform outer loop solution on the first main problem optimization model to obtain an optimal solution set x* of decision variables of the start-stop cost model and $\omega^*$ used for a next inner loop iteration, wherein $\omega^*$ is optimal $\omega$ obtained by solving the first main problem optimization model;

a worst scenario obtaining submodule, configured to perform inner loop solution on the first subproblem optimization model to obtain a worst scenario $u_*^+$ during an $m^{th}$ outer loop;

an outer upper bound update submodule, configured to update the outer upper bound $UB^{out}=\min\{UB^{out}, c^T x^* + \omega^*\}$ based on the optimal solution set x* of the decision variables of the start-stop cost model and $\omega^*$;

a first determination result obtaining submodule, configured to determine whether an absolute value of a difference between the updated outer upper bound and the outer lower bound is greater than a difference threshold to obtain a first determination result;

a constraint adding submodule, configured to: if the first determination result is yes, add $$\begin{cases} \omega \ge d^T y^{(m+1)} + g^T z^{(m+1)} \\ Ey^{(m+1)} + Fz^{(m+1)} \le f - Hx - Gu_*^+ \end{cases}$$

as a constraint into the first main problem optimization model, increase the number of outer iterations by 1, and return to the step of performing outer loop solution on the first main problem optimization model to obtain a first-stage optimal solution set x* and $\omega^*$ used for a next inner loop iteration, wherein $y^{(m+1)}$ represents a variable y used for an $(m+1)^{th}$ iteration; and $z^{(m+1)}$ represents a variable z used for the $(m+1)^{th}$ iteration; and an optimal dispatching plan output submodule, configured to: if the first determination result is no, output the optimal dispatching plan for the wind power generation and energy storage combined system considering the worst scenario $u_*^+$.

10. The optimal dispatching system for a wind power generation and energy storage combined system according to claim 9, wherein the worst scenario obtaining submodule comprises:

a second main problem optimization model and second subproblem optimization model division unit, configured to divide the first subproblem optimization model into a second main problem optimization model $$\begin{cases} \min d^T y + g^T z \\ Ey + Fz \le f - Hz^* - Gu^* \end{cases}$$

and a second subproblem optimization model $$\begin{cases} \max \theta \\ \theta \le g^T z^{(k)} + \left(f - Hx^* - Gu - Fz^{(k)}\right)^T \pi^{(k)}, \\ E^T \pi^{(k)} \le d^T, \pi^{(k)} \ge 0, u \in U \forall k \le n \end{cases}$$

wherein $\theta$ represents an objective function of a second subproblem; $z^{(k)}$ represents a binary decision variable in a second main problem during a $k^{th}$ iteration; and $\pi^{(k)}$ represents a dual variable during the $k^{th}$ iteration;

an inner layer initialization unit, configured to initialize an inner upper bound $UB^{in}$ to positive infinity, an inner lower bound $LB^{in}$ to negative infinity, and a number n of inner iterations to 1;

an inner upper bound optimal value obtaining unit, configured to solve the second subproblem optimization model to obtain a worst scenario u* and an optimal value $UB^{in}=\theta^*$ of the inner upper bound;

a second main problem optimization model solution unit, configured to solve the second main problem optimization model based on the worst scenario u* to obtain an optimal solution set y* of the continuous decision variable set of the operating cost model and an optimal solution set z* of the binary decision variable of the operating cost model;

an inner lower bound update unit, configured to update the inner lower bound $LB^{in}=\max\{LB^{in}, d^T y^* + g^T z^*\}$ based on the optimal solution set y* of the continuous decision variable set of the operating cost model and the optimal solution set z* of the binary decision variable of the operating cost model;

a second determination result obtaining unit, configured to determine whether an absolute value of a difference between the inner upper bound and the updated inner lower bound is greater than a difference threshold to obtain a second determination result;

a constraint adding unit, configured to: if the second determination result is yes, add $$\begin{cases} \theta \le g^T z^{(n+1)} + \left(f - Hx^* - Gu - Fz^{(n+1)}\right)^T \pi^{(n+1)} \\ E^T \pi^{(n+1)} \le d^T \end{cases}$$

as a constraint into the second subproblem optimization model, increase the number of inner iterations by 1, and return to the step of solving the second subproblem optimization model to obtain the worst scenario u* and the optimal value $UB^{in}=\theta^*$ of the inner upper bound, wherein $z^{(n+1)}$ represents a variable z for an $(n+1)^{th}$ iteration; and $\pi^{(n+1)}$ represents a dual variable for the $(n+1)^{th}$ iteration; and a worst scenario output unit, configured to: if the second determination result is no, output the worst scenario u*.

* * * * *